United States Patent
Beaver, III et al.

(10) Patent No.: US 12,314,992 B2
(45) Date of Patent: May 27, 2025

(54) METHOD AND COMPUTER READABLE STORAGE MEDIA FOR INTERFACING WITH THIRD PARTY PLATFORMS VIA COLLABORATION SESSIONS TO CUSTOMIZE PRODUCTS

(71) Applicant: ZAZZLE INC., Redwood City, CA (US)

(72) Inventors: Robert I. Beaver, III, San Francisco, CA (US); Jeffrey J. Beaver, San Francisco, CA (US); Leslie Young Harvill, Olympia, WA (US); Sean Narvasa, Oakland, CA (US)

(73) Assignee: ZAZZLE INC., Menlo Park, CA (US)

( * ) Notice: Subject to any disclaimer, the term of this patent is extended or adjusted under 35 U.S.C. 154(b) by 0 days.

(21) Appl. No.: 17/507,468

(22) Filed: Oct. 21, 2021

(65) Prior Publication Data

US 2023/0125873 A1   Apr. 27, 2023

(51) Int. Cl.
G06Q 30/06 (2023.01)
G06Q 10/101 (2023.01)
G06Q 30/0601 (2023.01)

(52) U.S. Cl.
CPC ....... *G06Q 30/0621* (2013.01); *G06Q 10/101* (2013.01)

(58) Field of Classification Search
CPC .......................... G06Q 30/06; G06Q 30/0621
See application file for complete search history.

(56) References Cited

U.S. PATENT DOCUMENTS 5,732,200 A   3/1998   Becker et al.
5,897,622 A   4/1999   Blinn
(Continued)

FOREIGN PATENT DOCUMENTS

CN   102799724 A   11/2012
EP   1 365 358 A2   11/2003
(Continued)

OTHER PUBLICATIONS

Ullah, I., & Narain, R. (2021). Linking supplier selection and management strategies with mass customization capability. The Journal of Business & Industrial Marketing, 36(7), 1213-1228. doi:http://dx.doi.org/10.1108/JBIM-04-2020-0183.*

(Continued)

*Primary Examiner* — Jeffrey A. Smith
*Assistant Examiner* — Jennifer V Lee
(74) *Attorney, Agent, or Firm* — Patterson & Sheridan LLP.; Malgorzata A. Kulczycka

(57) ABSTRACT

In some embodiments, a computer-implemented method comprises: receiving, at a computer collaboration computer, first customized product data from a first plugin executing on a first user device accessing a plurality of capabilities of a third party platform; wherein the first customized product data are associated with product description data for an interactive digital design; wherein the first customized product data have been created using the plurality of capabilities of the third party platform accessed from the first user device; generating, by the computer collaboration computer, first product description data for the interactive digital design by updating the product description data for the interactive digital design using the first customized product data; publishing, at the computer collaboration computer, the first product description data.

16 Claims, 16 Drawing Sheets

(56) References Cited

U.S. PATENT DOCUMENTS

| | | |
|---|---|---|
| 5,999,914 A | 12/1999 | Blinn |
| 6,058,373 A | 5/2000 | Blinn |
| 6,343,287 B1 | 1/2002 | Kumar |
| 6,411,965 B2 | 6/2002 | Klug |
| 6,542,515 B1 | 4/2003 | Kumar |
| 6,564,246 B1 | 5/2003 | Varma et al. |
| 6,591,011 B1 | 7/2003 | Nielsen |
| 6,614,451 B1 | 9/2003 | Hudson et al. |
| 6,664,972 B2 | 12/2003 | Eichel et al. |
| 6,725,257 B1 | 4/2004 | Cansler et al. |
| 7,016,869 B1 | 3/2006 | Haeberli |
| 7,062,483 B2 | 6/2006 | Ferrari et al. |
| 7,107,226 B1 | 9/2006 | Cassidy |
| 7,117,293 B1 | 10/2006 | Graziano |
| 7,376,891 B2 | 5/2008 | Hitchock |
| 7,502,788 B2 | 3/2009 | Balasubramanian |
| 7,617,184 B2 | 11/2009 | Ferrari et al. |
| 7,702,645 B2 | 4/2010 | Khushraj |
| 7,707,504 B2 | 4/2010 | Quang et al. |
| 7,725,364 B2 | 5/2010 | Tanaka et al. |
| 7,730,053 B2 | 6/2010 | Sauermann |
| 7,734,731 B2 | 6/2010 | Ordille et al. |
| 7,761,397 B2 | 7/2010 | Huelsman et al. |
| 7,777,747 B1 | 8/2010 | Krenz |
| 7,831,589 B2 | 11/2010 | Balasubramanian |
| 7,856,434 B2 | 12/2010 | Gluzman Peregrine et al. |
| 7,865,523 B2 | 1/2011 | Caballero et al. |
| 7,885,956 B2 | 2/2011 | Danish et al. |
| 7,930,313 B1 | 4/2011 | Geva |
| 8,175,931 B2 | 5/2012 | Harvill |
| 8,190,486 B1 | 5/2012 | Ouimet |
| 8,290,822 B2 | 10/2012 | Gade et al. |
| 8,335,724 B2 | 12/2012 | Sipes et al. |
| 8,429,110 B2 | 4/2013 | Cai et al. |
| 8,458,050 B2 | 6/2013 | Bagley et al. |
| 8,495,072 B1 | 7/2013 | Kapoor |
| 8,495,163 B2 | 7/2013 | Ordille et al. |
| 8,566,714 B1 | 10/2013 | Stringer et al. |
| 8,700,492 B1 | 4/2014 | Scott |
| 8,873,829 B1 | 10/2014 | Trya |
| 9,269,102 B2 | 2/2016 | Chen et al. |
| 9,704,187 B2 | 7/2017 | Chen et al. |
| 10,346,892 B1 | 7/2019 | Bagchi |
| 10,664,882 B2 | 5/2020 | Chen et al. |
| 10,997,642 B2 | 5/2021 | Chen et al. |
| 11,741,515 B2 | 8/2023 | Chen et al. |
| 2001/0034668 A1 | 10/2001 | Whitworth |
| 2002/0030689 A1 | 3/2002 | Eichel et al. |
| 2002/0073001 A1 | 6/2002 | Palmer et al. |
| 2002/0083039 A1 | 6/2002 | Ferrari et al. |
| 2003/0038799 A1 | 2/2003 | Smith |
| 2003/0080978 A1 | 5/2003 | Navab et al. |
| 2003/0182402 A1 | 9/2003 | Goodman |
| 2004/0044785 A1 | 3/2004 | Bell et al. |
| 2004/0133081 A1 | 7/2004 | Teller et al. |
| 2004/0143644 A1 | 7/2004 | Berton |
| 2004/0212617 A1 | 10/2004 | Fitzmaurice |
| 2005/0071242 A1* | 3/2005 | Allen ............... G06Q 30/0621 |
| | | 705/26.5 |
| 2005/0131571 A1 | 6/2005 | Costin |
| 2005/0138078 A1 | 6/2005 | Christenson et al. |
| 2005/0164766 A1 | 7/2005 | Haim et al. |
| 2005/0234993 A1 | 10/2005 | Ordille et al. |
| 2005/0258234 A1 | 11/2005 | Silverbrook et al. |
| 2006/0004697 A1 | 1/2006 | Lipsky et al. |
| 2006/0038815 A1 | 2/2006 | Loberg |
| 2006/0041421 A1 | 2/2006 | Ta |
| 2006/0107203 A1 | 5/2006 | Schilling |
| 2006/0149638 A1 | 7/2006 | Allen |
| 2006/0155612 A1 | 7/2006 | Haeberli |
| 2006/0197775 A1 | 9/2006 | Neal |
| 2007/0033568 A1 | 2/2007 | Barrieau et al. |
| 2007/0067179 A1 | 3/2007 | Kerr et al. |
| 2007/0094204 A1 | 4/2007 | Huelsman et al. |
| 2007/0098234 A1 | 5/2007 | Fiala |
| 2007/0112731 A1 | 5/2007 | Balasubramanian |
| 2007/0124215 A1 | 5/2007 | Simmons |
| 2007/0143082 A1 | 6/2007 | Degnan |
| 2007/0168336 A1 | 7/2007 | Ransil et al. |
| 2007/0174781 A1 | 7/2007 | Begin et al. |
| 2007/0203798 A1 | 8/2007 | Caballero et al. |
| 2007/0226066 A1 | 9/2007 | Brunner |
| 2007/0226155 A1 | 9/2007 | Yu et al. |
| 2008/0069451 A1 | 3/2008 | Ikeda |
| 2008/0091551 A1 | 4/2008 | Olheiser et al. |
| 2008/0162305 A1 | 7/2008 | Russo et al. |
| 2008/0244454 A1 | 10/2008 | Shibaike |
| 2008/0247674 A1 | 10/2008 | Walch |
| 2008/0285854 A1 | 11/2008 | Kotake et al. |
| 2009/0043673 A1 | 2/2009 | Caballero et al. |
| 2009/0043759 A1 | 2/2009 | Danish et al. |
| 2009/0043848 A1 | 2/2009 | Kordun |
| 2009/0089174 A1 | 4/2009 | Brunner |
| 2009/0177551 A1 | 7/2009 | Cue et al. |
| 2009/0195538 A1 | 8/2009 | Ryu et al. |
| 2009/0271295 A1 | 10/2009 | Hodge |
| 2009/0282403 A1 | 11/2009 | Poole |
| 2009/0289955 A1 | 11/2009 | Douris et al. |
| 2009/0317010 A1 | 12/2009 | Gerhard et al. |
| 2009/0324100 A1 | 12/2009 | Kletter et al. |
| 2010/0036753 A1 | 2/2010 | Harvill et al. |
| 2010/0066731 A1 | 3/2010 | Vecore et al. |
| 2010/0066750 A1 | 3/2010 | Yu et al. |
| 2010/0092079 A1 | 4/2010 | Aller |
| 2010/0100834 A1 | 4/2010 | Maconald |
| 2010/0114874 A1 | 5/2010 | Hansson |
| 2010/0145492 A1 | 6/2010 | Russell |
| 2010/0185529 A1 | 7/2010 | Chestnut et al. |
| 2010/0189316 A1 | 7/2010 | Walch |
| 2010/0238166 A1 | 9/2010 | Tamstorf et al. |
| 2010/0287511 A1 | 11/2010 | Meier et al. |
| 2010/0299616 A1* | 11/2010 | Chen ............... G06Q 30/0601 |
| | | 715/753 |
| 2010/0318442 A1 | 12/2010 | Paul et al. |
| 2010/0318476 A1 | 12/2010 | Huelsman et al. |
| 2011/0004524 A1 | 1/2011 | Paul et al. |
| 2011/0018895 A1 | 1/2011 | Buzyn et al. |
| 2011/0064388 A1 | 3/2011 | Brown |
| 2011/0098837 A1 | 4/2011 | Yucel et al. |
| 2011/0208618 A1 | 8/2011 | Christenson et al. |
| 2011/0225038 A1 | 9/2011 | Fontoura et al. |
| 2011/0280447 A1 | 11/2011 | Conwell |
| 2011/0305368 A1 | 12/2011 | Osako |
| 2012/0047045 A1 | 2/2012 | Gopikrishna et al. |
| 2012/0109777 A1 | 5/2012 | Lipsitz et al. |
| 2012/0117072 A1 | 5/2012 | Gokturk et al. |
| 2012/0123674 A1 | 5/2012 | Perks et al. |
| 2012/0158535 A1 | 6/2012 | Barrieau et al. |
| 2012/0198545 A1 | 8/2012 | Keenan et al. |
| 2012/0218300 A1 | 8/2012 | Hayakawa |
| 2012/0218468 A1 | 8/2012 | Tan et al. |
| 2012/0221428 A1 | 8/2012 | Harvill |
| 2012/0224743 A1 | 9/2012 | Rodriguez |
| 2012/0281013 A1 | 11/2012 | Mahdavi et al. |
| 2013/0054651 A1 | 2/2013 | Shepherd |
| 2013/0060801 A1 | 3/2013 | Beaver, III |
| 2013/0117227 A1 | 5/2013 | Kruglick |
| 2013/0304604 A1 | 11/2013 | Hoffman |
| 2014/0201187 A1 | 7/2014 | Larson |
| 2014/0215477 A1 | 7/2014 | Chen |
| 2014/0223575 A1 | 8/2014 | Nandi |
| 2014/0258832 A1 | 9/2014 | Hepp et al. |
| 2015/0025994 A1 | 1/2015 | Beaver, III et al. |
| 2015/0095345 A1 | 4/2015 | Arai |
| 2015/0220882 A1 | 8/2015 | Flores et al. |
| 2018/0075636 A1 | 3/2018 | Harvill |
| 2018/0247243 A1 | 8/2018 | Moolman et al. |
| 2018/0307794 A1 | 10/2018 | Bowman |
| 2020/0358783 A1 | 11/2020 | Beaver, III |
| 2021/0118031 A1 | 4/2021 | Beaver, III |
| 2021/0192097 A1 | 6/2021 | Beaver |

(56) References Cited

U.S. PATENT DOCUMENTS

| | | |
|---|---|---|
| 2021/0266352 A1 | 8/2021 | Beaver, III et al. |
| 2023/0360096 A1 | 11/2023 | Chen et al. |

FOREIGN PATENT DOCUMENTS

| | | | |
|---|---|---|---|
| JP | 2012527702 A | 11/2012 | |
| WO | 03/038688 A1 | 5/2003 | |
| WO | WO 2009/094724 A1 | 8/2009 | |
| WO | WO 2013/033643 A1 | 3/2013 | |
| WO | WO 2016/054651 | 4/2016 | |

OTHER PUBLICATIONS

Custom Ink, "Custom T-Shirts—Design Your Own T-Shirts Online—Free Shipping!" Web.archive.org, Oct. 28, 2018, web.archive.org/web/20181028214631/www.customink.com/. (Year: 2018).*

"Bring your group together with custom T-shirts & more!". CustomInk.com. (Nov. 14, 2018). http://web.archive.org/web/20181114232051/http://www.customink.com/#expand.*

Non-Final Office Action dated Jun. 26, 2023 for U.S. Appl. No. 17/967,577.

Final Office Action dated Dec. 1, 2023 for U.S. Appl. No. 17/967,577.

The International Searching Authority, "Search Report" in application No. PCT/US2020/031705, dated Sep. 28, 2020, 15 pages.

Current Claims in application No. PCT/US2020/031705, dated Sep. 2020, 7 pages.

JP Office Action dtd Mar. 6, 2024 for Japanese Patent Application No. 2021-565963.

Non-Final Office Action dated Aug. 23, 2024 for U.S. Appl. No. 17/967,577.

Notice of Allowance dtd May 12, 2024 for U.S. Appl. No. 17/967,590.

Non-Final Office Action dated Feb. 29, 2024 for U.S. Appl. No. 17/967,577.

The International Searching Authority, "Search Report" in Application No. PCT/US2022/39571, dated Nov. 4, 2022, 11 pages.

Nguyen, "The pros and cons of different data formats: key-values vs tuples", available: freecodecamp.org, published Dec. 28, 2018, 9 pages.

Current Claims in application No. PCT/US2014/044459, dated Oct. 24, 2014, 10 pages.

Claims for PCT application PCT/US12/53535, dated Aug. 31, 2012, 5 pages.

Hirokazu Kato and Mark Bilinghurst. "ARToolkit User Manual", Human Interface Technology Lab, University of Washington, dated 2000, 44 pages.

Evlioglu, S. Mass Customization in Footware Industry: Setting up a Web-Based Configurator. Politencico Di Milano. Dated Dec. 20, 2012.

European Patent Office, Office Action, in application No. 12181208.5 1238, dated Dec. 6, 2012, 7 pages.

European Patent Office, "Search Report" in application No. PCT/US2014/044459, dated Oct. 24, 2014, 11 pages.

Daniel Wagner, Tobias Langlotz, and Dieter Schmalstieg, Robust and Unobtrusive Marker Tracking on Mobile Phones, Washington, DC, USA, Dated 2008, IEEE Computer Society, 4 pages.

Homayoun Bagherinia O Roberto Manduchi, Robust Real-Time Detection of Multi-Color Markers on a Cell Phone, J Real-Time Image Proc., Dated Jun. 3, 2011, 17 pages.

Current Claims in application No. PCT/US2020/053585, dated Dec. 2020, 5 pages.

International Searching Authority, "Search Report" in application No. PCT/US12/53535, dated Feb. 5, 2013, 12 pages.

Current Claims in application No. PCT/US12/53535, dated Feb. 2013, 5 pages.

Capterra Website, "Top Product Configurator Software Products", dated 2014, Reviews of the Best Systems, accessed online <http://www.capterra.com/product-configurator-software> on May 28, 2014, 15pgs.

"Product Configurator", IBM, available: <http://www.-01.ibm.com/software/commerce/products/products/product-configurator/>, retrieved Nov. 26, 20103.

"Product Configuration System", Oracle, available: <http://www.bigmachines.com/product_configuration_system.php>, retrieved Nov. 26, 2013.

"Knowledge-based configuration", Wikipedia, available: <http://en.wikipedia.org/wiki/Knowledge-based_configuration>, retrieved Nov. 26, 2013.

"IBM Sterling Configurator—Customize complex products, services and bundles", IBM Software, available: <http://www.-01.ibm.com/software/commerce/products/products/product-configurator/>, Nov. 26, 2013.

Current Claims in European application No. 12181208.5 1238, dated Dec. 2012, 4 pages.

Myownbike.de-individual singlespeed and fixie bikes. Dated Feb. 21, 2012, www.behance.net/gallery/3197765/myownbike-individual-singlespeed-fixie-bikes.

UXMWN:, "MyOwnBike.de", dated Sep. 11, 2012, www. Http://vimeo.com/49234243, retrieved on Oct. 14, 2014, 1 page.

The International Searching Authority, "Search Report" in application No. PCT/US2020/053585, dated Dec. 15, 2020, 13 pages.

Ryan A. Beasley, Semiautonomous Medical Image Segmentation Using Seeded Cellular Automation Plus Edge Detector, dated 2012, Article ID 914232, 9 pages.

Qin et al., "Product Configuration Flow From Obtaining Customer Requirement to Providing the Final Customized Product", Journal of Software, vol. 7, No. 2., dated 2012, 12 pages.

Paul L. Rosin, "Training Cellular Automata for Image Processing", SCIA 2005, LNCS 3540, dated 2005, 10 pages.

Pantida Patirupanusara, Marker-Based Augmented Reality Magic Book for Anatomical Education, dated May 26-27, 2012, Phuket, 3 pages.

Hirokazu Kato et al. Marker Tracking and HMD Calibration for a Videobased Augmented Reality Conferencing System, San Francisco, USA Dated Oct. 1999, 10 pages.

Nima Soltani, Mehmet Yilmax, "Using Augmented-Reality on Planar Surfaced for Previewing Décor Changes", Stanford University EE368 Class Project Spring, dated 2010, 5 pages.

W. Lee and W. Woo, "Real-time Color Correction for Marker-Based Augmented Reality Applications", International Workshop on Ubiquitous VR (IWUVR2009), dated 2009, 4 pages.

Martin Hirzer, "Marker Detection for Augmented Reality Applications", Graz University of Technology, Austria, Dated Oct. 27, 2008, 27 pages.

Mark Fiala, "Artag, A Fiducial Marker System Using Digital Techniques", In CVRP '05: Proceedings of the 2005 IEEE, dated 2005, 7 pages.

Jun Rekimoto, "Matrix: A Realtime Object Identication and Registration Method for Augmented Reality", Computer Human Interaction, Dated 1998, Proceedings, 3rd Asia Pacific, Jul. 15-17, 1998, 6 pages.

Jun Rekimoto and Yuji Ayatsuka, "CyberCode: Designing Augmented Reality Environments with Visual Tags", Proceedings of DARE 2000 on Designing, Dated Apr. 2000, 10 pages.

Johannes Kohler, Alain Pagani, and Didier Stricker, Detection and Identification Techniques for Markers Used in Computer Vision, VLUDS.2010.36, dated 2010, 9 pages.

ISR WO for PCT Application PCT/US12/53535, dated Aug. 31, 2012, 12 pages.

Pokemon AR Marker in Sep. 2001 (http://pokemasters.net/forums/showthread.php?t=24845) 17 pages.

EP Search Report dated Nov. 23, 2023 for Application No. 20 728 606.3.

CA OA DTD Feb. 5, 2024 FOR Application No. CA 3,139,083.

CN Office Action DTD Jul. 11, 24 for CN 202080033662.2.

Notice of Allowance dtd May 15, 24 for U.S. Appl. No. 17/967,590.

* cited by examiner

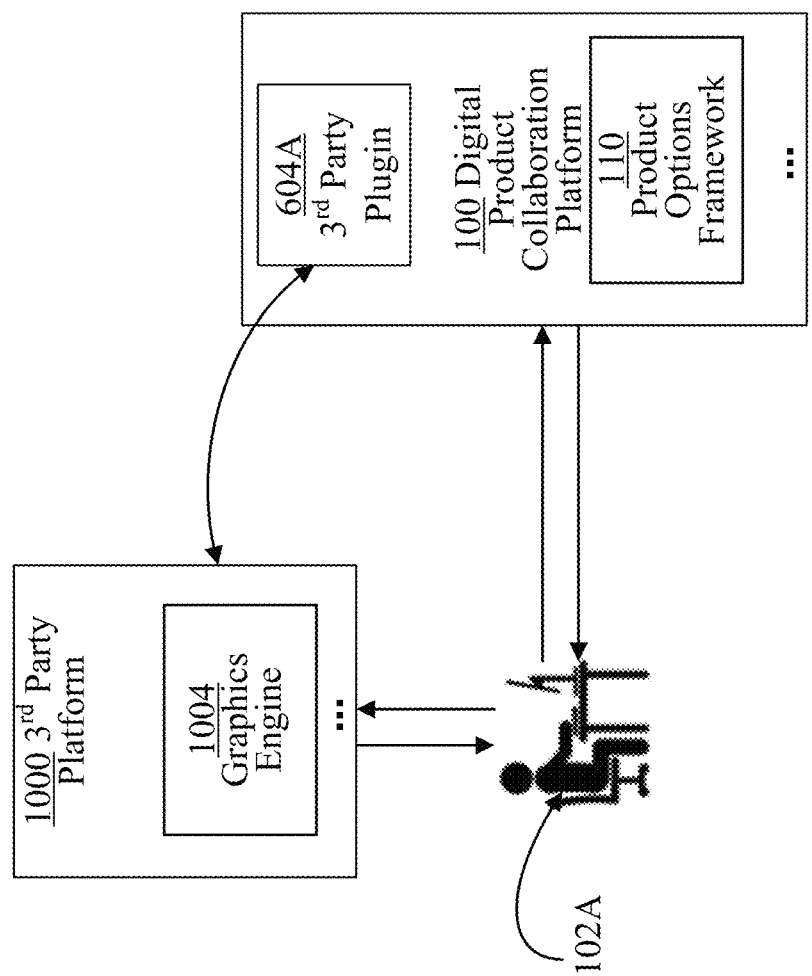
FIG. 1BBB

METHOD AND COMPUTER READABLE STORAGE MEDIA FOR INTERFACING WITH THIRD PARTY PLATFORMS VIA COLLABORATION SESSIONS TO CUSTOMIZE PRODUCTS

CROSS REFERENCE TO RELATED APPLICATIONS

This application is related to U.S. patent application Ser. No. 17/193,512, filed Mar. 5, 2021; U.S. application Ser. No. 17/038,659, filed Sep. 30, 2020; U.S. Pat. No. 8,090,461, granted Jan. 3, 2012; U.S. Pat. No. 8,175,931, granted May 8, 2012; U.S. Pat. No. 8,856,160, granted Oct. 7, 2014; U.S. Pat. No. 9,355,421, granted on May 31, 2016; U.S. Pat. No. 9,400,997, granted Jul. 26, 2016; U.S. Pat. No. 10,176,617, granted Jan. 8, 2019; and US published patent application no. 2013/0060654, filed Aug. 29, 2012; the entire contents of each of which are hereby incorporated by reference for all purposes as if fully set forth herein.

FIELD OF THE DISCLOSURE

One technical field of the disclosure is interfacing with third party platforms via collaboration sessions to support generating customized products via interactions with collaborative computer platforms. Another technical field is managing interactions between users collaborating across various platforms with the collaborative computer platforms.

BACKGROUND

Scalability of computer-based collaboration applications has been recently increasing due to the recent advances in computer technologies. Early examples of the collaboration applications include tools that offer collaborative text editing, text messaging, and multi-user task scheduling. Other collaboration applications offer shared spreadsheets, video conferencing, and video-sharing.

The recent innovations in information technologies have spurred the development of multi-user and multi-platform collaboration tools. Due to recent technological advances, many tools have been developed to facilitate, for example, an online-product-customization and interactivity capabilities between users. Collaborative customization of a product may include allowing multiple users to collaborate on digital designs, exchange ideas related to the designs, and provide support and assistance in customizing the appearance of the designs.

However, as the collaboration applications become more widespread, it becomes apparent that there is a need to enable interactivity between the users who would like to collaborate across different computer platforms.

Therefore, there is a need to provide mechanisms for managing communications across multi-platforms and multi-channels established between the users of role-based collaborative systems, especially for managing multi-platform-collaboration between the users.

SUMMARY

The appended claims may serve as a summary of the disclosure.

BRIEF DESCRIPTION OF THE DRAWINGS

In the drawings:

FIG. 1AA is a block diagram showing an example collaboration platform environment.

FIG. 1BB is a block diagram showing an example of interfacing with a product collaboration platform via a plugin downloaded onto a third party platform.

FIG. 1BBB is a block diagram showing an example of interfacing with a third party platform via a plugin downloaded onto a collaboration platform.

DETAILED DESCRIPTION

Figure 1A:
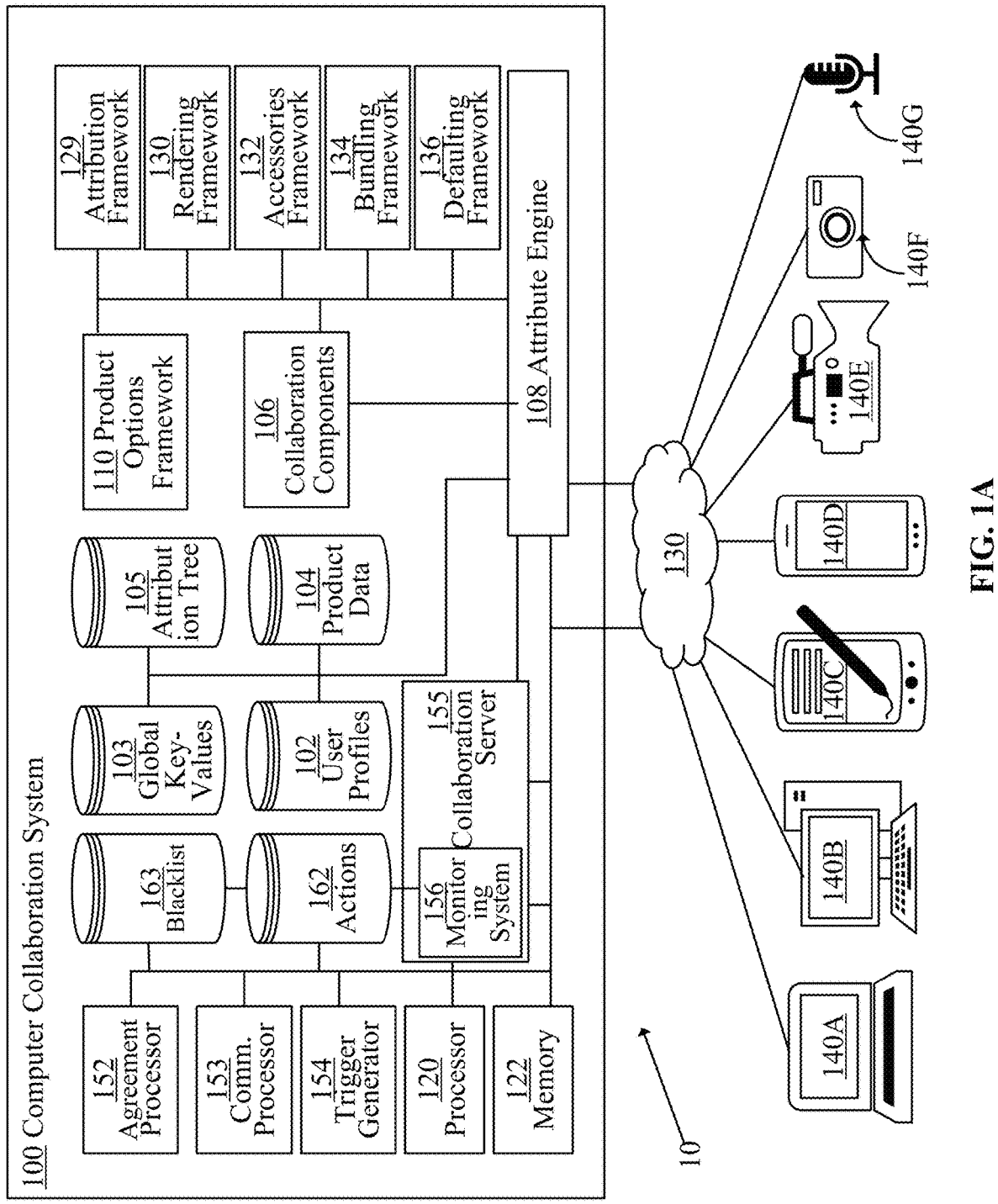
FIG. 1A is a block diagram showing an example product collaboration platform.
Figure 1A:
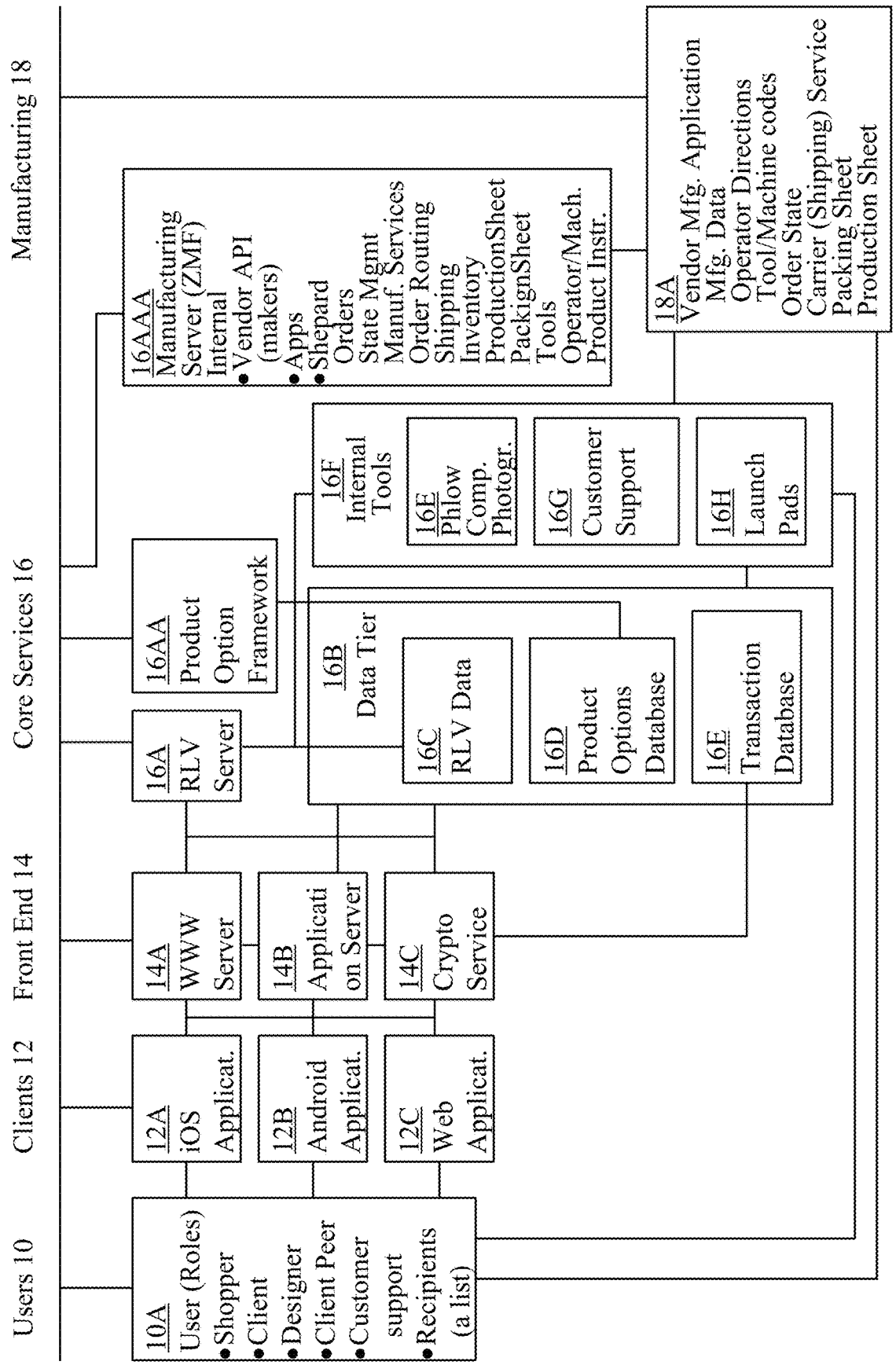

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach. Embodiments are disclosed in sections according to the following outline:

1. GENERAL OVERVIEW
2. COLLABORATION ACROSS DIFFERENT PLATFORMS
3. INTERFACING USING PLUGINS
4. INTERFACING BASED ON PLUGINS DOWNLOADED ONTO A THIRD PARTY PLATFORM
5. INTERFACING BASED ON PLUGINS DOWNLOADED ONTO A PRODUCT COLLABORATION PLATFORM
6. ROLE BASED PRODUCT COLLABORATION PLATFORM 6.1. USER ROLES
6.2. USER PROFILES
6.3. PRODUCT DEFINITIONS
6.4. ATTRIBUTE REPRESENTATIONS
6.5. GLOBAL KEY-VALUES
6.6. COLLABORATION COMPONENTS
6.7. PRODUCT OPTIONS FRAMEWORK
6.8. ATTRIBUTE ENGINES
6.9. USER COMPUTERS
6.10. COLLABORATION SERVER
6.11. MONITORING SYSTEM
7. EXAMPLE COMPUTER ENVIRONMENTS
　7.1. USER DEVICES
　7.2. CLIENT APPLICATIONS
　7.3. FRONT END SERVERS
　7.4. CORE SERVICES
　　7.4.1. GENERATING PRODUCT DESCRIPTION DATA
　　7.4.2. GENERATING KEY-VALUE PAIRS
　　7.4.3. GENERATING A GRAPHICAL USER INTERFACE
　7.5. EXAMPLE MANUFACTURING SYSTEM
　7.6. EXAMPLE MANUFACTURING PROCESS
8. KEY-VALUE PAIRS
9. EXAMPLE CHANNELS OF COMMUNICATION
10. SHARING ACCESS TO PRODUCT DESCRIPTION DATA
11. INTERFACING OPTIONS
　11.1. INTERFACING USING A PLUGIN DOWNLOADED ONTO A THIRD PARTY PLATFORM
　11.2. EXAMPLE FLOW CHART
　11.3. INTERFACING USING A PLUGIN DOWNLOADED ONTO A COLLABORATION PLATFORM
　11.4. EXAMPLE FLOW CHART
12. EXAMPLES OF INTERFACING SCENARIOS
　12.1. COLLABORATION WITH DIFFERENT THIRD PARTY PLATFORMS
　12.2. MULTIPLE PLUGINS
13. IMPLEMENTATION MECHANISMS

1. General Overview

In some embodiments, approaches for interfacing third party platforms with a product collaboration platform and interfacing the product collaboration platform with the third party platforms are presented. The presented approaches allow the users of different platforms to collaborate with each other via collaboration sessions established across the platforms.

The presented approaches for interfacing different platforms with each other allow the users of different platforms to utilize the functionalities of the platforms as the users create interactive digital designs. A product collaboration platform is a computer-based network of computer servers configured to support collaborative creation of interactive designs. A third party platform is any type of computer-based network of servers, other than the product collaboration servers, that may be utilized by the users participating in the collaborative creation of interactive designs.

The presented approaches allow interfacing all types of platforms and allow the users to collaborate across different platforms. Even if certain tasks may be performed using both types of platforms, i.e., a product collaboration platform and a third party platform, there might be some circumstances in which using the third party platform may be more convenient and more versatile for some users than using the collaboration platform. For example, some users, who might be professional designers, might want to use their third party platforms to process, modify, or enhance digital images as their artwork and collections have been developed using the third party platforms. According to another example, some users who face complex projects such as generating animated greeting cards, may prefer to use their third party platforms if such platforms have specialized animation tools. Therefore, depending on the project and the project requirements, in some situations, the users might prefer using the capabilities of the third party platforms, while in other situations, the users might prefer using the capabilities of the collaboration platform.

The presented approaches also provide the users with the publishing flexibility. The term "publishing" is used here to describe the transformation of the key-values comprising a ProductDescription, which is modified, through interaction, into manufacturing instructions, and subsequently used to manufacture of a custom product. This may apply to the production of a digital product (such as a digital greeting card) or a physical product (such as a greeting card printed on paper by an HP Indigo printer).

For example, in some situations, a user might want to publish, i.e., display and/or visualize, an interactive design using a collaboration platform, while in some other situations, the user might want to publish the design using a third party platform. For example, if the user wants to share his interactive design with his friends who use a particular third party platform, then the user might prefer publishing his design using the third party platform to allow his friends to collaborate on the design using the third party platform. However, if the user's friends use the collaboration platform, then the user might prefer publishing his design using the collaboration platform.

Collaboration sessions may be established between the users of a product collaboration platform and the users of third party platforms. The sessions may be implemented to provide the capabilities of both types of platforms to both groups of users. The collaboration session may be configured to, for example, provide real-time interactivity and interfacing functionalities that can be available to both: the users of the collaboration platform and the users of the third party platforms.

The two-way interactivity makes the capabilities of the collaboration platform available to the users of the third party platforms and the capabilities of the third platforms available to the users of the collaboration platform. Examples of capabilities of the collaboration platform include the automated concierge functionalities for creating/modifying/ordering interactive digital designs, role-based collaboration functionalities, designer-assisted functionalities for generating interactive designs, and the like. Examples of capabilities of the third platforms include the functionalities supported by the third party platforms, including, for example, graphics editing, photograph editing, digital images manipulation, and the like.

Portions of the third party APIs for plugins or collaboration may be proprietary. The proprietary assets of others are neither disclosed nor claimed herein. However, the mechanisms for interacting with the proprietary systems, and the manner in which, through the disclosed methods, these systems are able to modify ProductDescription(s) and cause a physical or digital product to be manufactured are disclosed herein.

2. Collaboration Across Different Platforms

There are many situations in which two or more users want to collaborate on one or more interactive designs.

Some of them may want to use third party platforms, while others may want to use a collaboration platform, to create and/or modify the same interactive digital design. The interactivity between the users across different platforms may be facilitated by plugins downloaded from a shared library and installed on the corresponding platforms.

The term plugin is used here to describe a functional unit of software, implemented as a series of instructions directly executed by a processor, or indirectly executed by a processor through a software interpreter. This functional unit of software interfaces with a software application through an application programming interface (API) and adds additional functionality to that application. Common examples of these interface may be found in the description of plugins for the Adobe products Photoshop (see, for example, photoshop/uxp/ps_reference/ at https://www.adobe.io, or for other applications such as Rhino, see api/cpp/modules.html at https://developershino3d.com).

The plugins may be configured to establish the corresponding communications connections between the users and the platforms and to transmit the updated/modified product description data for the interactive products across the platforms.

Some of the users may want to publish the created/modified interactive digital designs using the capabilities of third party platforms, while others may want to publish the created/modified interactive digital designs using the capabilities of a collaboration platform. For example, the users who typically use the third party platforms, may want to create, modify, or visualize a particular interactive design in collaboration with other users using the third party platform even if some other users collaborate from the collaboration platform. On the other hand, the users who typically use the collaboration platform, may want to create, modify, or visualize a particular interactive design in collaboration with other users using the collaboration platform even if some other users collaborate from the third party platform.

The users may communicate with each other across different platforms using one or more communications channels. The examples of communications channels may include online chats, text chats, video chats, phone chats, or graphical user interface (GUI)-based interactions. The communications channels may be configured to facilitate collaborative-video-screen sharing, data sharing, and the like.

According to the disclosed approaches, users of a collaboration platform may generate interactive digital designs of customized products in collaboration with designers and other users using the collaboration platform as well as with the users and experts using the third party platforms and vice versa. The requests to collaborate with the users using the collaboration platform and with the users using the third party platforms are generated and processed automatically. Once a collaboration session from the collaboration platform to a third party platform is established, a user of the collaboration platform may automatically and seamlessly select and use the functionalities of the third party platform. Similarly, once a collaboration session from a third party platform to the collaboration session is established, a user of the third party platform may automatically and seamlessly select and use the functionalities of the collaboration platform.

In some embodiments, a computer-implemented method for interfacing with third party platforms via collaboration session is executed on a product collaboration platform that interfaces with third party platforms. The platforms may be implemented in computer servers, a distributed computer system, a cloud-based system, and the like. The platforms may be configured to allow users, designers, agents, users, and support engineers to design, create, collaborate, and modify digital designs of products such as greeting cards, wedding invitations, water bottles, picture frames, and the like. The users, designers, users, and the like can collaborate with each other via communications sessions established between the collaboration platform, the user devices, and third party platforms, as described later.

Digital designs may be transmitted from a product collaboration platform to manufacturing servers, or manufacturing entities, that may use the received digital designs to manufacture products either digitally or physically. The manufactured product may be, in turn, delivered to recipients. Example computer environments for collaborating and creating digital designs, manufacturing products based on the designs, and delivering the products to recipients are described in FIG. 1A-1AA.

In some embodiments, a product collaboration platform is used to design, create, and order various products. Examples of the products may include digital products, i.e., the products designed and delivered digitally—such as digital gift cards, party invitations in digital forms, digital greeting cards, announcements in digital forms, and the like. The products may also include physical products, i.e., the products designed digitally but delivered as physical things—such as physical t-shirts, physical mugs, physical water bottles, physical picture frames, and the like.

A product collaboration platform may be used to provide various services. Examples of services provided by the product collaboration platform may include supporting creating and collaborating on interactive product designs, processing requests for assistance in creating interactive product designs, processing requests for services such as sending thank-you cards, joining a community of designers and users that use the platform, and reordering the products. Furthermore, the services may include creating and designing party invitations, greeting cards, gifts, and the like. The services may also include scheduling and planning events that occur periodically, such as birthdays, anniversaries, due dates, and the like. The services may further include planning events such as engagement parties, weddings, baby-shower parties, welcome-home parties, graduation parties, religious-event parties, and the like. Moreover, the services may include sharing pictures and comments with friends, families, acquaintances, and coworkers.

Users of a product collaboration platform may have assigned roles. A role assigned to a user is a function of the role that is assumed, or played, by the user who participates in a collaboration session established to create an interactive digital design. Examples of roles may include a user role, a graphics designer role, a user peer role, an agent role, an editor role, and the like. Based on the assigned roles, the users may be granted different types of access to product descriptions of interactive digital designs. The roles are described in detail later.

3. Interfacing Using Plugins

Figure 1B:
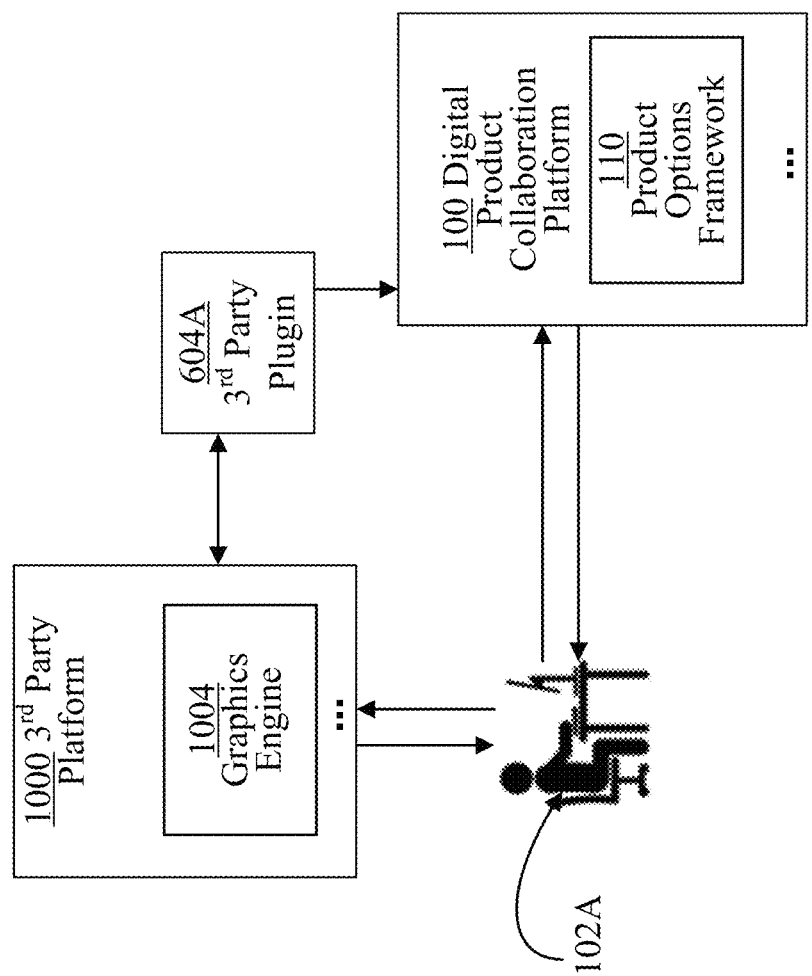
FIG. 1B is a block diagram showing an example of interfacing with a third party platform via a collaboration session with a collaboration platform.
Figure 1B:
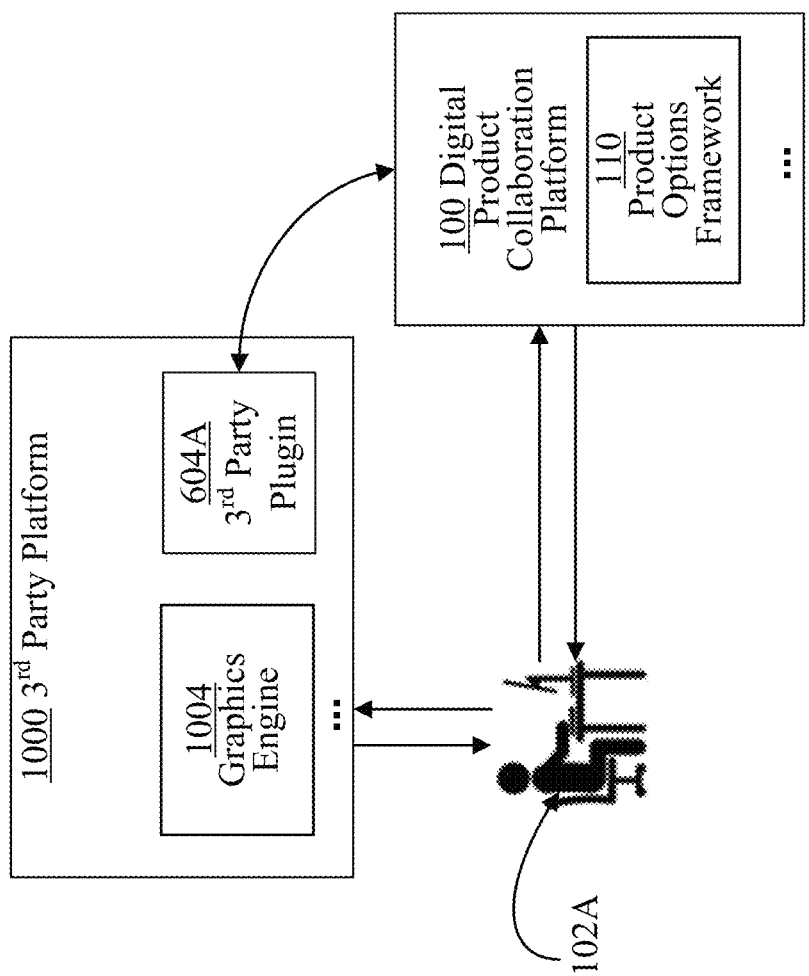

FIG. 1B is a block diagram showing an example of interfacing with a third party platform 1000 via a collaboration session with a collaboration platform 100. FIG. 1B, the other drawing figures, and all of the description and claims in this disclosure are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

Computer collaboration platform 100 may be configured to support collaborative creating of interactive designs. This may include providing automated concierge functionalities, role-based collaboration functionalities, and designer-assisted functionalities for generating interactive designs. An example of the collaboration platform is the Zazzle™ computer platform which functions as an on-demand marketplace to connect users with artists and designers and their state-of-art designs and products that can be customized, enhanced, and acquired. The collaboration platform is described in detail later.

Third party platform 1000 may be configured to support graphics editing, photograph editing, digital images manipulation, and the like. Examples of third party platforms include the Photoshop™ platform that provides the tools for editing photographs, compositing digital art, animating, generating graphic designs, and the like.

Referring again to FIG. 1B, user 102A may establish a collaboration session with product collaboration platform 100 and a collaboration session with a third party platform 1000, and utilize the capabilities of both platforms, i.e., the capabilities of a product options framework 110 of product collaboration platform 100 and the capabilities of graphics engine 1004 of third party platform 1000. The collaboration sessions are depicted using arrows.

The process of interfacing with third party platform 1000 via a collaboration session with collaboration platform 100 may start when collaboration platform 100 receives first customized product data from a first plugin 604A that has been stored in, for example, a shared library, and then downloaded onto, for example, a first user device from which user 102A accesses third party platform 1000.

The first customized product data are the data that are associated with product description data for an interactive digital design. More specifically, the first customized product data may be the data that are created as user 102A creates the interactive design using the capabilities of third party platform 1000. For example, suppose that user 102A accessed a third party platform 1000 that provides photograph editing tools. Suppose that user 102A uses the photograph editing tools executed on third party platform 1000 to edit and customize a photograph depicting an interactive design. As user 102A is editing and customizing the photograph, third party platform 1000 may create a data file that captures information about the attributes of the edited photograph. That data file may be called the first customized product data as it contains the data that describe the interactive design, i.e., the edited photograph.

First plugin 604A may be a software application, or a software component, configured to add specific features to third party platform 1000 and/or collaboration platform 100 to enhance the capabilities of each platform or both platforms. The plugin may be downloaded and installed from a shared library or a website that provides the authorized plugins. The plugin may be configured to, for example, enable third party developers to extend the original capabilities of third party platform 1000 and/or collaboration platform 100.

Typically, third party platform 1000 and collaboration platform 100 provide services which the plugins can convey to other platforms, including the way for the plugins to register themselves with a host application and a protocol for the exchange of data with the plugins.

The actual implementation of first plugin 604A may depend on the services provided by third party platform 1000 and/or collaboration platform 100. Third party platform 1000 and/or collaboration platform 100 may operate independently of the plugin, making it possible for user 102A to add and update the plugin dynamically without making changes to third party platform 1000 and/or collaboration platform 100 establishing a communications connection between the platforms. First plugin 604A may be dynamically downloaded at run time.

In FIG. 1B, plugin 604A is depicted as stored in a shared library. During the run time, plugin 604A may be downloaded onto third party platform 1000 (as shown and described in FIG. 1BB) or downloaded onto collaboration platform 100 (as shown and described in FIG. 1BBB).

Product description data for an interactive digital design, as is described in detail later, are the data that are associated with the interactive digital design and that are maintained by the product collaboration platform to capture all characteristics and relationships involving the interactive digital design.

The process of interfacing with third party platform 1000 may also include generating, by the computer collaboration computer, first product description data for the interactive digital design. The first customized product data may be created using, for example, the capabilities of third party platform 1000 accessed from the first user device. The first product description data may be generated by updating the product description data for the interactive digital design using the first customized product data. For example, computer collaboration platform 100 may retrieve the product description data associated with the interactive design and use the first customized product data saved in the file generated by third party platform 1000 and communicated from third party platform 1000 to product collaboration platform 100 through plugin 604A, to update the product description data for the interactive digital design.

Suppose that user 102A uses third party platform 1000 to edit a photograph (e.g., an interactive digital design) to add a text "Happy Birthday Mom" to the photograph. The attributes of the resulting composition that includes the photograph and the added text may be captured using the first product description data and used to update the product description data stored by product collaboration platform 100. The first product description data will capture the original characteristics of the photograph (i.e., the product description data associated with the interactive digital design), and the characteristics of the text added to the photograph.

Although customizing a photograph, as in the example described above, may be performed using both platforms, i.e., product collaboration platform 100 and third party platform 1000, sometimes using third party platform 1000 may be more convenient to some users. For example, some users might want to use third party platform 1000 to collaborate with their friends who also use the third party platform. The third party platform may provide, for example, the functionalities to process, modify, enhance digital images, animate greeting cards, and the like. In contrast, a collaboration platform may allow requesting assistance from experienced designers and allow accessing state-of-the-art designs and design collections. Therefore, depending on the project and the project requirements, in some situations, user 102A might prefer using the capabilities of third party platform 1000, while in other situations, user 102A might prefer using the capabilities of collaboration platform 100.

Moreover, depending on the circumstances, user 102A might want to publish, i.e., display and/or visualize, the resulting interactive design using either collaboration platform 100 or third party platform 1000. For example, once the first product description data for the interactive digital design is generated, user 102A may publish the first product description data using product options framework 110. More specifically, using the capabilities of product options framework 110, user 102A may cause the framework to generate a visual representation of the depiction showing the photograph and the added text "Happy Birthday Mom." The visual representation of the depiction may be displayed on a display device of a user device used by user 102A.

4. Interfacing Based on Plugins Downloaded onto a Third Party Platform

FIG. 1BB is a block diagram showing an example of interfacing with product collaboration platform 100 via plugin 604A downloaded onto third party platform 1000. In this example, plugin 604A has been downloaded from a shared library of plugins onto third party platform 1000.

Suppose that user 102A accessed third party platform 1000 that provides 3D model animation tools. Suppose that user 102A uses the 3D model animation tools executed on third party platform 1000 to generate an animation of a photograph frame (i.e., the animation of the interactive design). As user 102A is creating the animation, third party platform 1000 may create a data file that captures information about the attributes of the animation. That data file may be called second customized product data as it contains the data that describe the interactive design, i.e., the animation of the 3D model of the photograph frame.

Suppose that computer collaboration platform 100 receives the second customized product data from plugin 604A executing on third party platform 1000. The second customized product data are the data that are associated with product description data for an interactive digital design. The second customized product data may be the data that are created as user 102A creates the interactive design using the capabilities of third party platform 1000.

The second customized product data, containing the data associated with product description data for the interactive digital design, may be created using a plurality of capabilities of third party platform 1000 accessed from a user device of user 102A.

Collaboration platform 100 may generate second product description data for the interactive digital design by updating the product description data for the interactive digital design using the second customized product data. For example, the computer collaboration computer may retrieve the product description data associated with the interactive design and use the second customized product data saved in the file generated by third party platform 1000 and communicated from third party platform 1000 to product collaboration platform 100 through plugin 604A, to update the product description data for the interactive digital design.

Depending on the circumstances, user 102A might want to publish, i.e., display and/or visualize, the resulting interactive design using collaboration platform 100. For example, once the second product description data for the interactive digital design is generated, user 102A may publish the second product description data using the capabilities of a graphics engine 1004 to generate a visual representation of the depiction showing the 3D animation of the photograph frame. On the other hand, user 102A may want to publish the second product description data using third party platform 1000. The visual representation of the depiction may be displayed on a display device of a user device used by user 102A.

5. Interfacing Based on Plugins Downloaded onto a Product Collaboration Platform FIG. 1BBB is a block diagram showing an example of interfacing with third party platform 1000 via plugin 604A downloaded onto collaboration platform 100. In this example, plugin 604A has been downloaded from a shared library of plugins onto collaboration platform 100.

Suppose that user 102A uses the exploring capabilities of collaboration platform 100 to generate a collection of interactive designs of wedding gifts, including wedding art, pillows, mugs, wedding albums, blankets, barware, beddings, towels, and the like. Some of the designs may be available from third party platform 1000. For example, some of the wedding art designs may be part of the art collections offered by designers who have developed their collections using third party platform 1000. Those designs and collections may be made available to user 102A via plugin 604A downloaded onto collaboration platform 100.

Suppose that computer collaboration platform 100 receives third customized product data from plugin 604A executing on computer collaboration computer 100. The third customized product data are the data that are associated with product description data for an interactive digital design and created as user 102A creates the interactive design using the capabilities of collaboration platform 100. Suppose that user 102A accessed collaboration platform 100 that provides the capabilities of exploring different ideas for wedding gifts.

As user 102A is generating his interactive design, collaboration platform 100 may create a data file that captures information about the attributes of the collection and the individual gifts. That data file may be called the third customized product data as it contains the data that describe the collection of the interactive designs, i.e., the collection of various wedding gifts.

The third customized product data, containing the data associated with product description data for the interactive digital designs, may be created using the capabilities of collaboration platform 100 and the capabilities of third party platform 1000 accessed from a user device of user 102A.

Collaboration platform 100 may generate third product description data for the interactive digital designs by updating the product description data for the interactive digital designs using the third customized product data. For example, the computer collaboration computer may retrieve the product description data associated with the interactive design and use the third customized product data saved in the file generated by collaboration platform 100 to update the product description data for the interactive digital design.

Depending on the circumstances, user 102A might want to publish, i.e., display and/or visualize, the resulting interactive designs using third party platform 1000 or using collaboration platform 100. For example, once the third product description data for the interactive digital design is generated, user 102A may publish the third product description data using the capabilities of third party platform 1000 to generate a visual representation of the depiction showing the collection of the wedding gifts to share the visualization of the collection with his friends who also use third party platform 1000. User 102A may want to display the collection using the capabilities of third party platform 1000 rather than collaboration platform 100 because his friends may also use third party platform 1000 and it is more convenient for them to visualize the collection using the visualization capabilities of third party platform 1000. On the other hand, user 102A may want to publish the third product description data using product collaboration platform 100. The visual representation of the depiction may be generated using third party platform 1000 and displayed on a display device of a user device used by user 102A.

6. Role Based Product Collaboration Platform

In some embodiments, a computer-implemented method for interfacing with third party platforms via collaboration sessions is implemented in a product collaboration platform. The platform may be implemented in one or more computer systems that collaboratively provide the functionalities of the product collaboration platform. Alternatively, the approach may be implemented in one or more computer systems that communicate with the collaboration platform but that do not actually host the platform themselves. For the clarity of the description, it is assumed that the computer environment supporting the approach presented herein is implemented in the product collaboration platform.

FIG. 1A is a block diagram 10 showing an example product collaboration platform 100. In the example depicted in FIG. 1A, digital product collaboration platform 100 is provided herein to illustrate clear examples and should not be considered as limiting in any way. Other product collaboration platforms may include additional components such as computer servers, various input/output devices, and additional software and/or hardware components that are not depicted in FIG. 1A. Other product collaboration platforms may be implemented in cloud-based systems, distributed computer networks, and the like. Other product collaboration platforms may include fewer components than example digital product collaboration platform 100 shown in FIG. 1A.

Computer collaboration system 100 includes a user profiles database 102, a global-key-values database 103, a product data definitions database 104, an attribution trees database 105, collaboration components 106, a product options framework 110, an attribute engine 108, one or more processors 120, one or more memory units 122, and one or more frameworks 129-136.

Furthermore, computer collaboration system 100 includes a collaboration server 155 (including a monitoring system 156), one or more blacklist databases 163, one or more actions databases 162, an agreement processor 152, a communications processor 153, a trigger generator 154, and a code embedder 158. Computer collaboration system 100 may communicate directly, or via one or more communications networks 130, with one or more user computers 140A-140G, all described in detail later.

Among other things, components 152-153, 120 and 156 are configured to support collaboration server 155 in journaling key-value pairs that capture ownership and license agreements. They may also be configured to support transforming the key-value pairs into a graph-network and then into an ownership-agreement tree.

Components 152-153, 120 and 156 may also be configured to support collaboration server 155 in evaluating the ownership-agreement tree with respect to a plurality of role-based communications channels, established between the collaborators, for each constraint on each collaborator.

Moreover, components 152-153, 120 and 156 may support collaboration server 155 in determining whether one or more communications, monitored in the plurality of role-based communications channels, violate one or more constraints of the plurality of constraints.

That determination may include, among other things, generating transcripts of data intercepted from data communications channels supporting communications sessions established between collaborators. For example, components 152-153, 156 and 120 may generate a video transcript of the video chat and associate the transcript with the corresponding collaboration session. Components 152-153, 120 and 156 may provide the content of the transcript, including video frames, audio clips and chat texts, to monitoring system 156 and/or collaboration server 155.

Components 152-153, 120 and 156 may also be configured to collect statistical and diagnostic information about communications sessions established to support collaboration between users. For a communications session, the information may include information about the duration of the session, a count of retransmissions performed during the session, an indication of whether the session ended abruptly, and the like.

6.1. User Roles

Various roles may be assigned to users who interact with digital product collaboration platform 100 via user devices 140A-140G. Examples of roles may include a user role, a user support agent role, a graphics designer role, a user peer role, and a user product artist role. Based on the assigned roles, the users may be granted access to a product description of an interactive design as editors, viewers, managers, and the like.

A user role may be assigned to a user who is a user and who wants to customize one or more interactive designs offered by platform 100. A user may, for example, edit/modify attributes of an interactive object, view a rendering of the customized design, publish the customized design, request that another user (a designer or a user support agent) modify the interactive design according to the users' description, request a list of modifications that the user proposed for the interactive design, and/or delete or revert some of the modifications included in the list.

A user support agent role may be assigned to a user who may assist other users in customizing an interactive design. A user support agent may, for example, help in modifying the interactive design, provide various views of the rendered design, publish the rendered design on behalf of the user, and the like.

A graphics designer role may be assigned to a user who may assist in defining attributes for an interactive design, defining default values for the attributes for the design, defining ranges of the values for the attributes for the design, and/or customizing the interactive design. For example, a graphics designer may define a set of attribute-default values pairs and store the pairs in product data definitions 104. A graphics designer may also define a set of roles that may be assigned to the users and store the set of roles in user profiles, described in detail later.

A user peer role may be assigned to a user who may view an interactive design customized by someone else. A user peer may, for example, view the interactive design and provide comments or feedback on the design to the user. A user peer may be granted access to a product description for the customized design, and in some embodiments, may modify the attributes associated with the design.

A user product artist role may be assigned to a user who may provide tutorials and online help in customizing interactive designs. A user product artist may define attributes for the designs, determine default values for the attributes, determine ranges of values for the attributes, determine the roles for the user who may be allowed to customize the interactive designs, and/or demonstrate how to use the customization functionalities.

Figure 2A:
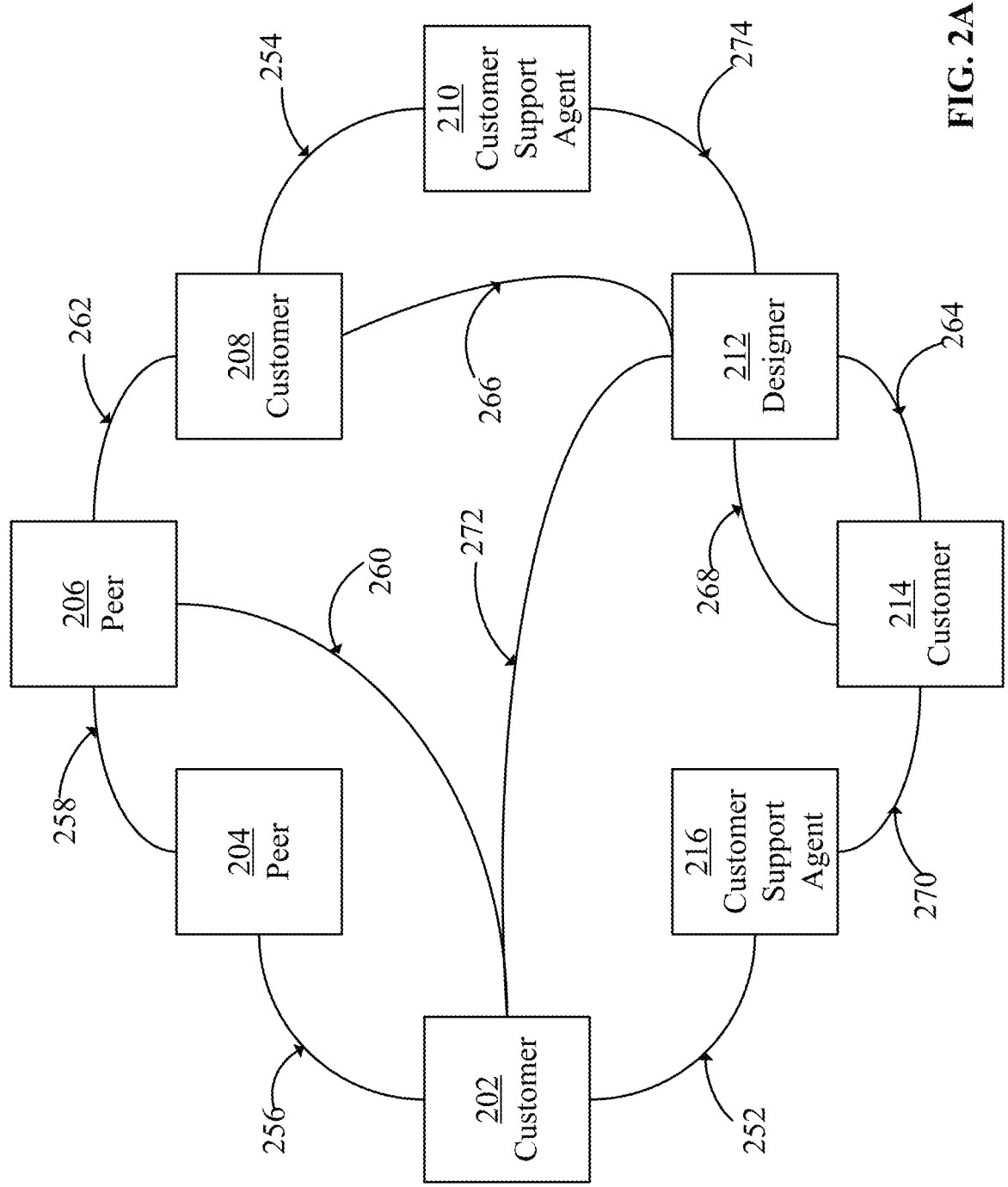
FIG. 2A is a block diagram showing examples of roles in a product collaboration platform.

FIG. 2A is a block diagram showing examples of roles in a product collaboration platform. In FIG. 2A, examples of user-agent collaboration sessions include a session 252 between a user 202 and a user support agent 216, a session 254 between a user 208 and a user support agent 210, a session 264 between a user 214 and a designer 212, a session 266 between user 208 and designer 212, a session 268 between a user 214 and a designer 212, a session 270 between a user 214 and user support agent 216, and a session 272 between user 202 and designer 212.

In some embodiment, a user may use email, text, phone, and any other type of communications to describe to a user support agent the design that the user would like to achieve. Once the user explains to the agent the desired design, the user may select, from his user interface, a user interface element that would allow setting an editor role to the agent so that the agent could edit the interactive digital design for the user. This would include granting the agent access to a product description associated with an interactive digital design as an editor.

In response to that, the agent may be provided with an updated user interface or a new user interface that would allow the agent to modify the interactive digital design. For example, the agent could select, from his user interface, a location-based attribute (or a group of attributes) and modify a value associated with the attribute, select another attribute, and modify it, and so forth. Each modification may be automatically saved as a serialized key-value pair, and this solves the technical problem of navigating through countless sets of attributes and dealing with, for example, countless clicks to complete the customization as required in conventional customization platforms. The pairs may be transmitted to a product options framework, which would update the product description for the interactive digital design. Then, a product options framework may render a modified depiction of the interactive digital design and propagate the rendering to the user computers for rendering in the corresponding user interfaces.

6.2. User Profiles

Referring again to FIG. 1A, digital product collaboration platform 100 may include one or more storage devices for storing user profiles database 102. User profiles database 102 may be used to store information indicating roles assigned to individual users, access codes or keys assigned to the users, identifiers and passwords assigned to the users, and the like.

6.3. Product Definitions

Digital product collaboration platform 100 may further include one or more storage devices for storing product data definitions database 104. Product data definitions database 104 may include product descriptions of one or more interactive designs that are offered by digital product collaboration platform 100. A product description of an interactive design may include, for example, a global key-values set, a set of attributes that are associated with the design, and default values that may be assigned to the attributes of the design. Global key-value sets are described later.

6.4. Attribute Representations

Collaboration components 106 may include a component that is used to store a representation of attributes of an interactive design. The attributes may correspond to characteristics of the products and may be selected or provided by manufacturers of the products. The attributes may have assigned default values and the default values may be assigned either by the manufacturers, system administrators managing digital product collaboration platform 100 or platform 10, or artistic designers, as described earlier.

Descriptions of the attributes for each interactive design, or groups of designs, may be stored as part of collaboration components 106 or in a separate data structure that may be organized as a data table or storage space that is accessible to collaboration components 106. The descriptions of the attributes and values of the attributes associated with the products may be provided and/or requested by other components of digital product collaboration platform 100, such as a product options framework 110, which is described later.

For each interactive design available for customization using platform 100, default values of the attributes associated with the product may be modified by users according to the roles assigned to the users and according to the manufacturing constraints provided by a manufacturer. For example, if a customized product is a t-shirt, its default color may be red, but a user may modify the color by selecting any of three colors (e.g., red, green, or blue) to the t-shirt. The modification may be stored in, for example, product data definitions 104.

An interactive design can be defined as the subset of the custom product attributes that may be altered, added, manufactured, or embellished for the purpose of custom product manufacturing. While the product attributes are product specific, they may include the substrate color or material choice for an area of the product, the trim material or color of a product, printed, engraved, or embroidered embellishments, and/or color palettes applied to the design.

Attribute definitions and types, as well as default values for the attributes of an interactive design, may be provided by a manufacturer or a designer of the design. The attributes and default values may be changed by the users according to, for example, the roles assigned to the users. For example, a user who is assigned a role of an artistic designer may be allowed to edit/modify the attributes associated with the design, edit the default values of the attributes, as well as edit the ranges of the values that may be assigned to the attributes.

Suppose that an interactive design is a mug. Then an artistic designer may define several attributes for the mug and define default values for the attributes. The attributes may include a color, a size, a label, and an ornamental design imprinted on the mug. The default values for the attributes may include red for the color, large for the size, hello for the label, and white stripes for the ornamental design. The artistic designer may also define that a user may modify the color of the mug by selecting either red or blue and may modify the size of the mug by selecting either large or small.

In some embodiments, a product description may include, or be associated with, a journaled list of modifications that have been submitted by users for an interactive design. The list may also include other information such as identifiers of the users who provided the modifications, global key-values generated as the collaborators collaborated on the customized product, a history log of the modifications that have been accepted, reverted, or deleted, comments that have been provided by the user, and the like. For example, one or more modifications stored in the list may be undone or redone by using a couple of clicks, not by performing countless clicks to undo or redo the customization as in conventional customization platforms.

6.5. Global Key-Values

Digital product collaboration platform 100 may include one or more storage devices for storing global key-values database 103. Global key-values database 103 may store global key-values sets that are used to track the contribution of each collaborator in a collaboration session, and to impartially establish copyrights and ownership for the customized product developed during the collaboration session.

All global key-value pairs created and modified during a particular collaboration session are global in scope of that particular collaboration session. A global key-value may correspond to a tuple, or a pair, that has a key and a value. While the key has a persistent meaning across all transactions, the value is scoped to a specific collaboration session. The key may indicate an attribute identifier/key, while the value may indicate a specific value for the key. For example, a global key-value for an attribute called "owner" may include an "owner" as a key and a specific "user identifier" as a value. Detailed examples of global key-values are described later.

For each customization project, at least one global key-values set is generated. For example, when a customization project starts and a project owner initiates a collaboration customization session, collaboration system 100 may initiate global key-values to indicate, for example, an identification of the owner, an identification of his license, and the like. Thus, the initial global key-values set may include the following pairs: {Owner, user ID1}, {License, User ID1}. When the owner invites, for example, a designer to assist the owner with the customization, collaboration system 100 updates the set of global key-values by adding an additional global key-value pair to indicate, for example, an identification of the designer. Thus, the additional global key-value pair may include: {Designer, user ID2}. When the owner decides to finish the collaboration customization session, collaboration system 100 may, for example, combine the relevant global key-value pairs and initiate the processing of the pairs, as will be described later.

Examples of global key-values may include constraints that specify rules and applicability of the rules to a product customization process, and transactions that specify entities and customization instructions for customizing the product. An example of a constraint global key-value may include an age restriction constraint that prohibits individuals younger than 12 to customize the product. An example of a transaction global-key value may include a key-value pair that comprises customization instructions for a product customization.

In some embodiments, constraint global key-values may be specified by an owner, a designer, and the like, during a product customization session, and may be used to specify one or more constraints to be applied to a product customization process. The examples of constraint global key-values may include an age restriction constraint which may be represented as a key-value pair {Age, 12}. Age restriction constraint may, for example, indicate the minimum age of a user who could purchase a custom product. Since certain products may be inappropriate for children, using a constraint global key-value pair {Age, 12} may indicate that only users who are at least 12 years old may purchase that product.

Another example of a constraint global key-value is a content lock constraint, which may specify that a key-value or set of key-values may not be modified. Content lock may be a full lock, a partial lock, or a specific lock. For example, a user may specify that a first design is fully locked, while a second design is locked only if one attempts to modify a particular portion of the design (a partial lock or a specific lock).

Examples of constraint global key-values may also include a blacklist content restriction constraint. This constraint may pertain to a list of content, such as imagery, text, color, or material composition. Blacklist constraint may include a blacklist key "Blacklist," and one or more names, words, and the like, to form: {Blacklist, name1, word1, . . . }.

Additional examples of constraint global key-values may include a whitelist content restriction constraint. This constraint may pertain to a list of content, such as imagery, text, color, or material composition, that may be used to modify a key-value, or a set of key-values in the saved data of a product description, which is described later, or when a key value journal is applied to a custom product. Whitelist constraint may include a whitelist key "Whitelist," and one or more names, words, and the like, to form: {Whitelist, name1, word1, . . . } Additional details of constraint global key-values are described later herein.

6.6. Collaboration Components

Referring again to FIG. 1A, digital product collaboration platform 100 may include one or more software applications configured to implement collaboration components 106. Collaboration components 106 may include modules that are used to implement a role-based collaboration between users. The types of the modules included in collaboration components 106 may vary and may depend on the implementation of platform 100.

Collaboration components 106 may include a component that is used to store a representation of user interface elements (not shown) that users may use to collaborate with each other and to customize interactive designs.

A user may modify values of attributes defined for an interactive design by using user interface elements presented and displayed for the user in a user interface. Examples of user interface may include a graphical user interface, a command-line interface, and the like. The user may use the user interface elements to customize/modify a style, color, size, label, ornamental design, surface qualities, material type, and the like of the interactive design. Furthermore, the user may customize individual portions of the customizable product or groups of portions of the customizable product.

The type and selection of user interface elements to be provided to a user may depend on a role assigned to the user. For example, if a user is a user, then the user may edit his own interactive design, and thus he may be provided with a user interface that includes the interface elements that allow the user to edit and view the design, invite others to help the user in editing the design, invite others to view the design, and the like.

User interface elements may be specific not only to a role assigned to a user, but also to an interactive design itself. For example, if platform 100 offers customizable ties and customizable scarfs, and a user profile for a user includes information indicating that the user is a male, then it is assumed that the user might want to customize a tie, not a scarf. Furthermore, it may be assumed that the user would like to customize a color, a material, and a shape of the tie. Based on that information, collaboration components 106 may select the user interface elements that are specific to the tie and to the selection of the tie attributes.

Collaboration components 106 may include a component that is used to store a representation of graphical user interface elements (not shown) associated with design areas of a customizable product. Design areas may include one or more areas defined within the customized product that a user may customize and/or modify. For example, if platform 100 offers customizable mugs, then design areas may include an area for showing an outside surface of the mug, an area for showing an inside surface of the mug, and an area for showing a surface of the mug handle. A product description for the design may specify that a user may modify the appearance of each of the surfaces separately, or that the user may group the surfaces and modify the group.

6.7. Product Options Framework

In some embodiments, product options framework 110 comprises a plurality of modules and applications which, when executed by one or more processors 120, cause the processors to implement the approach for collaborative video chat screen sharing using a digital product collaboration platform. As shown in FIG. 1A, product options framework 110 may be configured to communicate with an attribution framework 129, a rendering framework 130, an accessories framework 132, a bundling framework 134, and a defaulting framework 136.

Attribution framework 129 may be configured to, for example, generate an attribution tree based on global key-values collected during a customization session. Attribution framework 129 may also be configured to use the attribution tree to determine and verify corresponding licenses and copyright privileges for users/collaborators who participated in the customization session. Furthermore, attribution framework 129 may be configured to track the contributions of the collaborators and to derive the manufacturing instructions from the global key-values collected during the session.

Product options framework 110 may be configured to receive inputs from rendering framework 130 to generate a rendering of an interactive design based on, at least in part, a current representation stored in collaboration components 106. Product options framework 110 may be also configured to receive inputs from accessories framework 132 to determine one or more accessories for an interactive design, and to include the determined accessories in the customization of the product.

Furthermore, product options framework 110 may be configured to receive inputs from building framework 134 to determine constraints for customizing an interactive design. This may include determining one or more attributes that are associated with the design and that can be customized by users. This may also include assigning default values to the determined attributes, determining ranges of values for the attributes, and/or determining sets of values that may be assigned to the attributes.

Product options framework 110 may be also configured to receive inputs from defaulting framework 126 to determine a default design for an interactive design, determine default roles that may be assigned to the user, and determine initial values for various parameters and attributes associated with the designs and collaboration sessions.

6.8. Attribute Engines

Attribute engine 108 may be configured to facilitate role-based collaboration of customizable products according to roles assigned to users and according to manufacturing constraints set forth for the products.

Attribute engine 108 may be configured to, for example, interact with collaboration components 106, product options framework 110, frameworks 130-136 and user devices 140A-140D to allow the users using devices 140A-140G to collaborate in customizing interactive designs offered by platform 10.

In some embodiments, attribute engine 108 may be configured to interact directly with users of user devices 140A-140G. In other embodiments, attribute engine 108 may be configured to interact with users of user devices 140A-140G via a computer network 131, as shown in FIG. 2.

Computer network 131 may be implemented as any type of communications network, including a local area network (LAN), wide area network (WAN), a wireless network, a secure virtual LAN (vLAN), a secure virtual WAN (vWAN), and the like.

6.9. User Computers

User devices 140A-140G may include any type of communications devices configured to facilitate communications between users and digital product collaboration platform 100. In the example depicted in FIG. 1A, a user device 140A is a laptop, a user device 140B is a personal computer, a user device 140C is a personal assistant device, a user device 140D is a mobile device such as a smartphone, a user device 140E is a video camera, a user device 140F is a digital camera, and a user device 140G is a microphone configured to capture audio data and communicate the audio data to digital product collaboration platform 100.

The types and counts of user devices 140A-140G are not limited to the examples shown in FIG. 1A. For example, even though FIG. 1A depicts only one laptop 140A, one personal computer 140B, one personal assistant 140C, one smartphone 140D, one video camera 140E, one digital camera 140F, and one microphone 140G, platform 100 may include a plurality of laptops 140A, a plurality of personal computers 140B, a plurality of personal assistants 140C, a plurality of smartphones 140D, a plurality of video cameras 140E, a plurality of digital cameras 140F, and a plurality of microphones 140G. In other examples, user devices may include fewer devices than those depicted in FIG. 1A. In yet other examples, the user devices may include devices that are not depicted in FIG. 1A.

6.10. Collaboration Server

Collaboration server 155 may be implemented in software, hardware, or both, and may be configured to cooperate with monitoring system 156 to provide monitoring capabilities to operators of the platform and/or a third-party monitoring service. The capabilities may include the ability to intercept contents of communications exchanged between the users of the collaboration platform, determine whether the communications meet the terms of the collaboration agreements, and pursue actions to address violations when the communications fail to meet the rules set forth in the agreements.

Collaboration server 155 may be part of digital product collaboration platform 100, as shown in FIG. 1A. Alternatively, a collaboration server may be a system implemented in a computer server (not shown) that is separate from digital product collaboration platform 100.

In some embodiments, collaboration server 155 may comprise monitoring system 156, as shown in FIG. 1A. In other embodiments, collaboration server 155 may be separate from monitoring system 156.

In some embodiments, collaboration server 155 is configured to transform ownership and license agreements, embedded in a plurality of key-value pairs journaled during a collaboration session between collaborators, into a graph-network and then into an ownership-agreement tree. The ownership-agreement tree may be used to represent the ownership and license agreements between the collaborators participating in the collaboration session.

Collaboration server 155 may be also configured to evaluate the ownership-agreement tree with respect to a plurality of role-based communications channels, established between the collaborators, for each constraint of a plurality of constraints on each collaborator of the collaborators.

The constraints may be identified from the ownership-agreement tree, and may include rules, guidance, conditions, specifications, and provisions that set forth the manner in which collaborators may communicate with each other during collaboration sessions. Examples of constraints may include agreement constraints (such as ownership agreements, license agreements, and the like), use constraints (that impose limits on editing and modifying design elements produced by collaborators), communications constraints (that impose limits to durations of the sessions, inactivity during the sessions, and the like), interactions constraints (such as contractual constraints and professional-conduct constraints), and content constraints (imposing blacklists and whitelists on the communications). Some of the constraints may be system-wide constraints and apply to one or more, or all, collaborations supported by a collaboration platform.

6.11. Monitoring System

In some embodiments, monitoring system 156 is implemented as a component of collaboration server 155, as shown in FIG. 1A. In other embodiments, monitoring system 156 is implemented as a server (not shown) separate from collaboration server 155.

Monitoring system 156 may be configured to cooperate with collaboration server 155 in terms of tracking and monitoring the communications exchanged between collaborators, generating transcripts of the communications, and parsing the transcripts to determine characteristics of the corresponding data streams.

Monitoring system 156 may also be configured to assist collaboration server 155 in evaluating an ownership-agreement tree with respect to role-based communications channels, established between the collaborators, to determine whether any communications exchanged between the collaborators violate any constraints of a plurality of constraints.

7. Example Computer Environments

In some embodiments, a computer-implemented method for interfacing with third party platforms via collaboration session is executed in a product collaboration platform that allows users, designers, agents, users, and support engineers, to, for example, collaborate in designing and creating digital designs of customized products across multiple computer platforms. A customized product may be a digital product, such as a digital gift card, or may be a physical product, such as a physical t-shirt.

FIG. 1AA is a block diagram showing an example collaboration platform environment. In FIG. 1AA, users 10 are individuals who create and design digital designs of products; clients 12 correspond to software applications configured to facilitate communications between users 10 and front end servers 14; core services 16 correspond to software applications and tools configured to facilitate creating and designing of the digital designs and generating manufacturing instructions for manufacturing final products based on the digital designs; and manufacturing 18 corresponds to manufacturing servers and applications configured to manufacture, or cause manufacturing, the final products, generate tokens that allow recipients of the final products to request services and access to core services 16, and attach the tokens to, or depict the token on, the final products.

7.1. User Devices

FIG. 1AA depicts several examples of users 10. Each of users 10 may use its own, or shared, computer device. Examples of user devices are described later in FIG. 1A. Users 10 may have assigned roles. Examples 10A of roles may include a user, a designer, a client peer, a user support engineer, a recipient, and the like. Examples of user roles are described in detail in FIG. 2A.

7.2. Client Applications

Clients 12 in FIG. 1AA refer to client applications that are implemented in client servers and that are configured to support requests received from users 10A. Non-limiting examples of clients 12 may include iOS applications 12A, Android applications 12B, Web applications 12C, and the like.

7.3. Front End Servers

Front end servers 14 refer to computer-based servers that are configured to process requests received from clients 12 and from core services 16. Examples of front end servers 14 include one or more WWW servers 14A, one or more application servers 14B, one or more cryptographic servers 14C, and the like. Cryptographic servers 14C may be configured to provide cryptographic services for encrypting/decrypting, transmitting, or otherwise communicating data between the entities depicted in FIG. 1AA.

7.4. Core Services

Core services 16 in FIG. 1AA refer to servers and services implemented in a role-based collaboration platform configured to provide functionalities for creating and designing digital designs, handle collaboration requests, and facilitate the customization requests received from users 10.

7.4.1. Generating Product Description Data

Referring again to FIG. 1AA, a customization process performed by a user, of users 10, and intended to generate a digital design of a customized product is captured in so-called product description data, which then may be translated into a manufacturing description comprising product and manufacturing instructions.

The product and manufacturing instructions may include digital design specifications, data, and code needed to manufacture a custom product. That may include instructions for generating, for example, a 3D geometry for digital final products. This may also include generating instructions for generating 2D and/or 3D patterns that may be used to cut, cast, or form physical components of physical final products. The patterns may be parametric, i.e., they may have parameters that, through encoded relationships, adjust the form of the pattern for a specific need.

For instance, a set of 2D patterns for a t-shirt graded based on size, may become a parametric pattern by interpolating grade curvatures. A single parametric value may set this automatic grading. The single parametric value is usually called a 'size.'

The product instructions may also include models, including 2D and 3D models that are used to form, through additive manufacturing, or subtractive manufacturing, portions of a product. The models may be parametric, i.e., they may have parameters that, through coded relationships, adjust the form of the model for a specific need. For instance, a set of 3D models may represent a bike helmet. Each model may fit a statistically normed human head of a specific age. A coded relationship between the models may allow for interpolation of the set of models for a specific age. A single parametric value may set the automatic interpolation. The single parametric value in this case is usually called an 'age.'

The product instructions may also include material properties such as a physical material used to form a product from a pattern. Some material properties may be parametric, i.e., they may be selected or changed during the manufacturing time.

The properties may also include a body color. For instance, the color of a fabric may be selected for manufacturing a t-shirt. According to another example, the color of a plastic may be selected for manufacturing a bike helmet.

The properties may also include a body texture such as the fabric weave of a t-shirt may be specified to be smooth or slubby. For instance, the surface of a plastic bike helmet may be polished or satin. Each property is necessarily specific to each class of materials. Examples of materials and properties may include a fabric (such as a weave or knit type, a fiber type (cotton, wool, flax, polyester, polypropylene), a thread size, a thread count, a color, an integral design (ikat, knit, tapestry), a bolt width, a selvage type, a surface (hand), and the like.

The properties may also include plastics, which may include sub-properties such as a color, a surface quality (a bidirectional luminance function), a melting point, impact resistance, a forming method (thermoplastic, cast), a type (acrylic, abs, polypropylene, etc.), and the like.

The properties may also include metals, which may include sub-properties such as a type (aluminum, steel, copper, brass, etc.), a color, a surface quality (e.g., a bidirectional luminance function), a melting point, a tensile strength, a shear strength, a toxicity, and the like.

The properties may also include non-woven specified by a type (paper, felt, Tyvek, etc.), a color, a surface quality (e.g., a bidirectional luminance function), a surface type (hot pressed, natural, textured, etc.), a weight per square meter, an acid content, a compatible media, coating, and the like.

The properties may also include metamaterials which may be described as a combination of multiple materials created during a manufacturing process. For instance, during a fused deposition manufacture, plastics with a variety of properties may be mixed to provide a physical product with gradations of flexibility, durometer, and the like. According to another example, during laser sintering of metals, a mix of metal alloys with a variety of properties may be deposited, resulting in a product composed of gradations of metallic properties. According to yet another example, during high resolution uv-printing, layers of the uv-cured material with different refractive indices may be deposited, resulting in a large variety of optical effects.

The properties may also include embellishment such as a trim-color, designs, and applied ornaments. The trim colors may indicate the color of the edging around the sleeve of a t-shirt, the color of the trim around the base of a bike helmet, and the like.

The designs may indicate a custom printed front of a t-shirt, a custom thermal printed design to the side of a bike helmet, and the like.

The applied ornaments may indicate rhinestones on a t-shirt, holographic spangles on a bike helmet, and the like.

Some properties may apply to a large class of products and may allow for a limited set of properties to be transferred from one product to another. Other properties may be specific to a particular product or manufacturing method.

It may be appreciated that much of the novel art of the system and method is in enumerating the constraints imposed by manufacturing a specific custom product and crafting these constraints as a set of product option key-value pairs. These manufacturing constraints are propagated through the entire system and method, and by using these product option key-values, allowing for the manufacturing of a series of custom products that meet these physical constraints.

Referring again to FIG. 1AA, in some embodiments, core services 16 refer to services implemented in a role-based collaboration platform. In the depicted example, core services 16 may be provided by one or more real-view (RLV) servers 16A and a product option framework 16AA. Both RLV servers 16A and product option framework 16AA may use one or more data tier databases 16B, including RLV Data 16C, a product options database 16D, a transaction database 16E, and the like. Examples of the RLV approaches are described, for example, in U.S. Pat. Nos. 8,856,160, 9,436,963, 8,654,120, 8,712,566, 8,958,633 B2, and 9,436,963; and U.S. patent application Ser. Nos. 17/193,512, 17/143,955, 17/038,659, and 16/867,898.

In some embodiments, core services 16 may also utilize internal tools 16F, such as a "Phlow" computational photographical tools 16E, a user support tools 16G, a launch pads tools 16H, and the like.

Product option framework 16AA is also referred to as a persistent design data framework. The framework data may include a product options set, which may include a set of product options pertaining to a specific product type. In some embodiments, depicted in FIG. 1AA, a set of product options contains the product instructions generated by, for example, a product option framework 110 and collaboration components 106, shown in FIG. 1AA, for manufacturing, or producing, the product. Examples of the product option frameworks are described, for example, in U.S. Pat. Nos. 8,856,160, 9,436,963, 8,654,120, 8,712,566, 8,958,633 B2, and 9,436,963; and U.S. patent application Ser. Nos. 17/193, 512, 17/143,955, 17/038,659, and 16/867,898.

Referring again to FIG. 1AA, product option framework 16AA is configured to provide services for transforming ProductOption key-value pairs (i.e., manufacturing constraints) from one product to the other. Transforming the ProductOption key-value pairs from one product to another may require, for example, transforming the color space (i.e., sRGB to CMYK US Web Coated (SWOP) v2), transforming an image from raster to vector, and/or resizing the image for the fit. An example use case of the product option framework is described in detail in FIG. 1AA.

In some embodiments, there are two basic types of product instructions (1) fixed (that include the instructions for the product which are fixed and not customized), and (2) custom (that contain the logic to transform a user interface parameter into a product instruction).

In some embodiments, the product option set contains the logic to enumerate each customizable option in a manner that presents a complete user interface to change the parametric product instructions.

The instructions for manufacturing a customized product are usually parametric. The parameters include the size of the customized product (this can be multi-dimensional, and include width, height, depth). The parameters may also relate to human sizes or ages. The parameters may also be custom and based on biometric information.

The parameters may also include a component body color, a component body texture, a trim body color, a trim body texture, a design area, and the like.

7.4.2. Generating Key-Value Pairs

In some embodiments, a product option may be represented as a key-value pair. The key-value pair is a label that may span individual products and represent a class of products. The keys of pairs may include a material type, a color, a size, and the like.

The value in a key-value pair is a specific discrete or continuous value that sets a manufacturing instruction. Examples of discrete (enumerated) values may include a discrete type of fabric such as cotton, cotton-polyester blend, silk, and the like. The discrete values may also include specific colors, such as white, navy, black, and the like.

Examples of continuous values of key-value pairs may include a single element, such a length or a ribbon, a vector, such as a size of a frame for a print (width (in inches)) or a height (in inches)), or the size of a box for the European countries, such as a size of a box for the EU (width (in millimeters), height (in millimeters), depth (in millimeters)).

The values may also reference a known file type, such as an image for the design on a t-shirt, such as an embroidery file for the back of a jacket, such as an engraving design for a bracelet, and the like.

In some embodiments, values in key-value pairs may include a set of graphic primitives for a design, such as an image, a line, a circle, a rectangle, a text, a group, and the like.

The product option key-values may have default values. Default values are pre-set values that will produce a product without changing any key-value pairs through customization. When key-values are changed they may produce a product option framework event chain. A product option framework event chain is a journal of each key-value change ordered in time.

A product type may itself be represented by a product option key-value. Using this option type, one product type may be associated with another product type through a well-known relationship.

In some embodiments, a product option framework event chain includes one or more products, and the chain may represent or memorialize an event. The products may represent or memorialize an event. Examples of events may include invitations, save the date cards, birthday cards, birthday gifts, anniversary cards, birth announcements, RSVP cards, holiday cards, holiday gifts, thank-you cards, get-well cards, and the like.

Many products fit into an event chain. For example, the products that fit into a wedding event may include the following products: save the date products, invitations, RSVPs, bachelor party invite products, bachelorette party invite products, party favors products, gift registry cards, place cards, napkins, wedding programs, wedding gifts, thank-you cards, wedding keepsake photos, and the like.

Examples of products that may fit into a birthdate event may include the following products: invitations, RSVPs, party bags, party keepsake photos, and the like.

In some embodiments, in a product option set event chain, a key-value pair encodes the next product in the chain. For example, an invitation may be chained to an RSVP card. A key-value may also encode the role for the chained event. For example, a chained RSVP card key-value may further include a recipient of the invitation as the sender role for the RSVP card.

A key-value pair may also encode the shared properties used to set the chained product's properties. For instance, a design for the invitation may be shared with the RSVP card. A key-value may also encode the timing for the chained product. Typically, the event chain properties are custom (parametric), and they may be changed by a product designer to fit a specific product set.

7.4.3. Generating a Graphical User Interface

In some embodiments, a product option framework is configured to generate a product option framework user interface. Accordingly, each product option set is associated with logic and code to build a user interface element for each parametric product option. Furthermore, each product options set contains style hints so that each user interface element may be artfully placed to produce a high quality user experience.

Typically, user interface elements are designed to match each class of values found in all products covered by a product option framework. New user interface elements may be added as the product categories expand. The user interface elements may include a design view, a color editor, a font editor, a size selector, a texture selector, a text editor, a fabric swatch selector, a product real view, and the like.

In some embodiments, a product options framework cooperates with a user product renderer that may be implemented in, for example, a RealView server 16A. The user product renderer may be configured to render views of a custom product as though it is already manufactured. Typically, it uses a product option set of key-values as input. It creates one or more run-time assets using computational photography of the manufactured product.

7.5. Example Manufacturing System

Referring again to FIG. 1AA, manufacturing instructions may be communicated from core services 16 to manufacturing 16, which may include one or more manufacturing servers 16AAA. Servers 16AAA may receive the manufacturing instructions, process the instructions, and communicate with a vendor manufacturing application 18A to generate, for example, manufacturing data, operator directions, tool/machine codes, and the like. The application may also generate information about an order state, a packing slip, a production sheet, and the like. Some of that information may be communicated to a carrier (shipping) service selected to deliver the final products to the recipients.

For creation of RealView assets, a final product may be manufactured using markups. A markup for, for example, a body color of a product may be made by specifying a distinct and separate color for BodyColor key-value. A markup for the trim color of a product may be made by specifying a distinct and separate color for, for example, a TrimColor key-value pair. A markup for a design area of a product may be made by specifying a specific marker type (e.g., a removable linear markup, a digital markup, or a digital field markup) for a design-area image.

Construction of a so-called Product RealView geometry may be performed using computational photographic techniques using products manufactured with markup. For example, a BodyColor area of a surface may be recognized and layered as a custom computer graphics shader for rendering light, color, and texture. Each TrimColor area's surface may be recognized and layered as a custom computer graphics shader for rendering light, color, and texture. Rendering of the Product RealView may be performed by setting its product option key-values and shading each of its constructed layers.

7.6. Example Manufacturing Process

A manufacturing process may pertain to manufacturing a digital product as well as manufacturing a physical product. Since the manufacturing instructions for generating a product are generated based on a plurality of key-value pairs for a digital design of the product, in some situations, the same manufacturing instructions may be used to manufacture the digital product as well as to manufacture the physical product.

In some embodiments, a product options framework builds an interface for a key called OutputStyle. The interface for the OutputStyle key may allow a designer (or any other collaborator) to select values for the media for the presentation of an interactive design. The choices may include a JPEG_Image, a GIFF_Image, and an H264_Video.

If a designer chooses the GIFF_Image option, then the product options framework may send the instructions to the manufacturing system to traverse each of the key-values in the KeyValueJournal, and for each key, and use a User Product Renderer to render the state of the custom physical product with that modification as images in the sRGB 32-bit RGBA format. Subsequently, the manufacturing system may store the renderings in a local image cache.

Then, the manufacturing system may traverse the images stored in the local image cache and determine an optimal color palette for that collection of images.

Subsequently, the manufacturing system may convert the images in the local image cache from 32-bit RGBA format to 8 bit Indexed color.

Then, the manufacturing system may embed a digital watermark which encodes the input KeyValueJournal's UUID in the 8 bit indexed color image cache.

Next, the manufacturing system may begin encoding the image file. For example, the manufacturing system may write the header bytes; write the Logical Screen Descriptor bytes; write the found color palette as a gif Global Color Table; write the gif 8 bit character application name; and embed metadata as a comment (or a watermark) which encodes the input KeyValueJournal's UUID.

Next, the manufacturing system sets a FrameCount to 1 and proceeds to processing each frame in the image file. The processing includes checking if there is an image in the 8 bit indexed color image cache; and if so, then the manufacturing system continues; otherwise, the manufacturing system proceeds to taking the next image.

To continue, the manufacturing system writes the gif Graphic Control Description for the FrameCount, and then processes the first 8 bit indexed color image cache into blocks of 255 LZW compressed bytes.

Next, the manufacturing system writes the compressed bytes, and removes the first image from the 8 bit indexed color image cache. Then, the manufacturing system increments the FrameCount and repeats the process for the next frame.

Once the manufacturing system processes all frames, the manufacturing system writes the file terminator (such as an ASCII code for zero) to the image file and outputs the manufactured GIF product.

At this point, executing the manufacturing instructions for the purpose of manufacturing the product ends, and the manufacturing of the product is completed.

8. Key-Value Pairs

Product description data for an interactive design may include data that digitally captures the characteristics and parameters of the interactive design. Product description data may be used to manufacture the customized product corresponding to the interactive design. Product description data may be also used to generate a graphical visual representation of the interactive design that is capable of custom manufacture with a plurality of variable product attributes. Product description data may be parsed by a computer collaboration computer to identify a plurality of global key-value pairs that are journaled within the product description data for a plurality of contributors.

A global key-value pair usually includes a key and a value associated with the key. The global key-value pair is referred to as global because it is global to a current collaboration session. While the key has a persistent meaning across all transactions, the value is scoped to a specific collaboration session. Furthermore, all global key-value pairs created and modified during a particular collaboration session are journaled and saved for that particular collaboration session.

Based on, at least in part, the plurality of global key-value pairs, an ownership-attribution tree is constructed. Based on, at least in part, the ownership-attribution tree, manufacturing instructions for customizing the physical product and according to the plurality of variable product attributes are generated. The manufacturing instructions may be transmitted to a product customization server to cause a manufacturing entity to proceed with generating a customized product based on the manufacturing instructions.

Examples of the global key-value pairs may include: an age restriction key-value that includes an age restriction key and an age value; a content lock key-value that includes a content lock key and a content lock key value; a blacklist key-value that includes a blacklist key and a blacklist; a whitelist key-value that includes a whitelist key and a whitelist; an ownership key-value that includes an ownership key and a user universally unique identifier (i.e., a user ID); a copyright key-value that includes a copyright key and a user ID; a license key-value that includes a license key and a universally unique identifier for a specific license agreement held between an owner or a primary designer and a computer collaboration computer; a user support key-value that includes a support key and a support agent contract identifier; and an attribution key-value that includes an attribution key and a universally unique identifier that references a set of software instructions for manufacturing to apply a marking on a product as may be directed by copyright or licensing agreements. Other global key-values, such as key-values that are specific to an implementation or a line of products, may also be implemented.

In some embodiments, the product description data for the interactive design is generated as one or more modifications to the interactive design are received from one or more user interfaces and are used to update the interactive design.

The plurality of global key-value pairs, journaled within the product description data, may be created when a customization session for customizing the interactive design is initiated. The plurality of global key-value pairs may be updated each time when a contributor, who has been granted a valid license and who participates in the customization session, provides modifications to the interactive design. The plurality of global key-value pairs may carry license agreement information and restriction information specific to the customization session and the interactive design.

In some embodiments, upon detecting that no further modifications for the interactive design are provided, the plurality of global key-value pairs journaled within the product description data are stored in a global key-values database.

9. Example Channels of Communication

Once a particular designer is selected from a set of available designers and designated to aid a user in creating an interactive digital design, the particular designer and the user may communicate with each other using one or more communications channels established between the designer and the user across a collaboration computer system. Examples of the channels include a video session The video, text, and voice sessions may be embedded in the collaboration web or mobile interface, or an external application may be used (such as a Zoom meeting, a WebEx meeting, and the like), a phone meeting, a text-chat, annotations, and the like. In some embodiments, one or more simultaneous communications channels may be established between the particular designer and the user. Examples of various channels of communication are described in FIG. 2B.

Figure 2B:
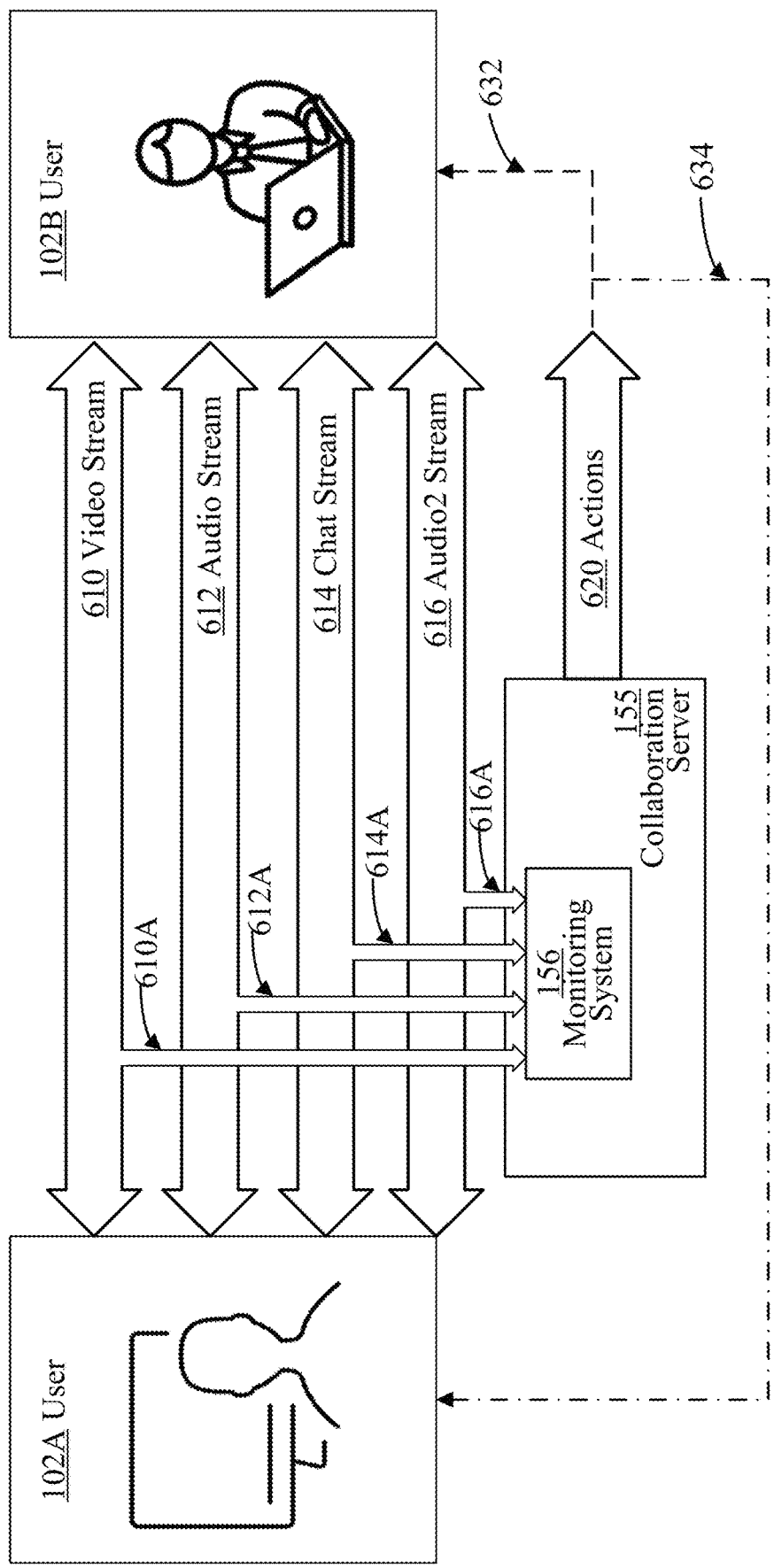
FIG. 2B is a block diagram showing examples of communications channels established between users.

FIG. 2B is a block diagram showing examples of communications channels established between users. Suppose that a user 102A and a user 102B collaborate with each other on an interactive design using a collaboration platform, a third party platform, or both types of platforms.

Suppose that user 102A initiated, from his user device, a communications session with a user device of user 102B. Examples of the communications sessions may include a live video-based session, a live-audio session, and a live chat with a designer and/or support engineer.

If the devices of users 102A, 102B establish a video session, then the corresponding communications channel communicates a video stream 610 between users 102A, 102B. If the devices are connected using an audio session, then the corresponding communications channel communicates an audio stream 612 between users 102A, 102B. If the devices are connected using a chat session, then the corresponding communications channel communicates a chat stream 614. If the devices are connected using a phone line, then the corresponding communications channel communicates an audio2 stream 616. In some embodiments, the devices of users 102A, 102B may establish two or more concurrent sessions.

In some embodiments, each of the data streams communicating between the users 102A, 102B may be intercepted by monitoring system 156 (shown in FIG. 1A) or any other component, or device, configured to intercept the data streams. Referring to the example depicted in FIG. 2B, the intercepted data includes one or more of: an intercepted video stream 610A, an intercepted audio stream 612A, an intercepted chat stream 614A, or an intercepted audio stream 616A. In some embodiments, additional streams may be intercepted.

In some embodiments, the intercepted data are processed by monitoring system 156 and/or computer collaboration computer 155 (both shown in FIG. 1A). The processing may include generating transcripts of the intercepted data streams and processing the transcripts to determine various characteristics of the interactions between users 102A, 102B. For example, based on the intercepted data streams, monitoring system 156 may determine whether the transcripts include characteristics that trigger violations of the term of use of the collaboration platform. The violations may include non-responsiveness, inappropriate language, non-addressing the questions, violations of ownership-license agreements, and the like.

If it is determined that the characteristics included in the transcripts trigger violations of the constraints included in, for example, an ownership-licensing tree capturing the terms of use of the collaboration platform, then computer collaboration computer 155, or a component cooperating with computer collaboration computer 155, determines one or more actions 620. The actions may include, for example, generating messages or notifications which may be sent (element 634) to user 102A and/or sent (element 632) to user 102B. Alternatively, or in addition to, the messages may be sent to a manager of the collaboration platform and/or a manager who oversees the designers working using the collaboration platform.

10. Sharing Access to Product Description Data

Customization of an interactive design in collaboration between users who collaborate using a product collaboration platform and/or third party platforms may include creating the design and modifying the design by the users. To be able to customize the design, the users may share access to product description data associated with the design.

In some embodiments, to be able to collaborate on an interactive design by two users, one user may request a collaboration session with another user and be supported by a collaboration platform. Once the session is established, the users may share access to the product description data that are associated with the interactive design and that include corresponding key-value pairs.

A collaboration session may support a communications session between the users, a modification session for modifying an interactive design by the users, a modification session for modifying the interactive design by the users, and the like. The sessions may be merged into one collaboration session. Examples of different sessions are described in FIG. 2B.

A modification session for modifying an interactive design may be established for each user. To initiate a modification session for a user, a product collaboration platform may generate a user interface for the user. The interface may be generated based on, at least in part, information stored in a user profile. That information may include information indicating the user's role. The user interface may include the functionalities that are specific to the user, and that allow the user to collaborate with others, modify the attributes of an interactive design, store the modifications in a product description associated with the interactive design, store the modifications in a journaled list of modifications for the interactive design, prune and reorder the journaled list, and publish the rendering of the modified interactive design.

In some embodiments, the product collaboration platform may cause displaying, in a user interface executing in a user device of the user, an interactive design along with annotations representing attributes, attribute groups and the locations within the design to which the attributes apply. The attributes, default values for the attributes and default ranges for the values for the attributes may be provided by an attribute engine which may be part of the product collaboration platform. The attribute engine may define and/or filter the attributes according to constraints provided by manufacturers, designers, or system administrators.

11. Interfacing Options

A product collaboration platform may be configured to facilitate downloading a plugin from a shared library. A plugin, as described before, is a software-based application or a software-based component that, once downloaded and initiated on a computer device or server, provides additional functionalities to the device or server.

In terms of interfacing a third party platform with a product collaboration platform, if a plugin is downloaded onto and initiated at the collaboration platform, then the plugin provides the interface capabilities and functionalities allowing a user of the product collaboration platform to import product description data for an interactive design from the third party platform onto the collaboration platform and to merge the imported product description data for the interactive design with the product description data maintained by the collaboration platform for the interactive design.

However, if a plugin is downloaded onto and initiated at a third party platform, then the plugin provides the interface capabilities and functionalities allowing a user of the third party platform to import product description data for an interactive design from the collaboration platform onto the third party platform and to merge the imported product description data for the interactive design with the product description data maintained by the third party platform platform for the interactive design, In response to receiving, in a user interface, a rendering of an interactive design with the annotations, a user may select, using the functionalities of the user interface, a specific attribute or a specific attribute group at a specific location within the depiction of the interactive design and select or adjust a value associated with the attribute. For example, the user may select a width-attribute and use a slider object, provided by the user interface, to set a new value for the width parameter. The new value of the parameter may be transmitted as a serialized key-value pair to a product options framework.

If a user requests assistance from, for example, a designer, a collaboration platform may allow the user and the designer to share access to the product description data that are associated with the interactive design and that include the corresponding key-value pairs. For example, upon receiving the request, the platform may initiate a modification session for the designer and may generate a user interface for the designer. The interface may be generated based on, at least in part, information stored in a designer profile. That information may include information indicating the designer's role. The user interface may include the functionalities that are specific to the designer, and that allow the designer to collaborate with others, modify the attributes of an interactive design, store the modifications in a product description associated with the interactive design, store the modifications in a journaled list of modifications for the interactive design, prune and reorder the journaled list, and publish the rendering of the modified interactive design.

The collaboration platform may allow either the user or the design access the product description data, or both. However, the switching between the access may be implemented each time either the user or the designer requests the access to the product description data.

The switching between the access may be performed multiple times, usually until the user and the designer are satisfied with the resulting interactive design or until they decide to terminate the collaboration session. At that time, serialized key-value pairs for the interactive design at a location on a server or in a cloud system are stored and a hyperlink to the location where the pairs are stored is created. Upon receiving a serialized key-value pair, the product options framework may store the serialized key-value pair in a journaled list of modifications for the interactive design.

Upon receiving a request to view the journaled list from the user, the attribute engine may provide the journaled list to the user interface executing on the user device and cause the user interface to display the journal list. At this point, the user may review the modifications included in the journaled list, reorder the modifications included in the list, remove some modifications from the list and/or request applying of the modifications included in the list to the interactive object. The user may also request generating a rendering of the current interactive design. If the rendering of the current interactive design is completed, the user may view the rendering in any of a plurality of available views.

In some embodiments, the user may accept the rendered depiction of the modified design and request that the customized design be sent to a manufacturer or a distributor. Then the user may place an order for an actual product that is based on the customized design provided to the manufacturer or distributor.

11.1. Interfacing Using a Plugin Downloaded onto a Third Party Platform

Computer collaboration platform 100 may be configured to support collaborative creating of interactive designs across multiple platforms. The collaboration platform may provide automated concierge functionalities, role-based collaboration functionalities, and designer-assisted functionalities for generating interactive designs. An example of the collaboration platform is the Zazzle™ computer platform which functions as an on-demand marketplace to connect users with artists' and designers' state-of-art designs and a variety of products that the users can customize, enhance, and acquire.

Third party platform 1000 may be configured to support graphics editing, photograph editing, digital images manipulation, and the like. Examples of third party platforms include Photoshop™ platform that provides the tools for editing photographs, compositing digital art, animating, generating graphic designs, and the like.

Referring again to FIG. 1BB, user 102A may establish a collaboration session with product collaboration platform 100 and a collaboration session with third party platform 1000. Using plugin 604A downloaded onto third party platform 1000, the user may utilize the capabilities of both product options framework 110 of product collaboration platform 100 and graphics engine 1004 of third party platform 1000.

11.2. Example Flow Chart

Figure 3A:
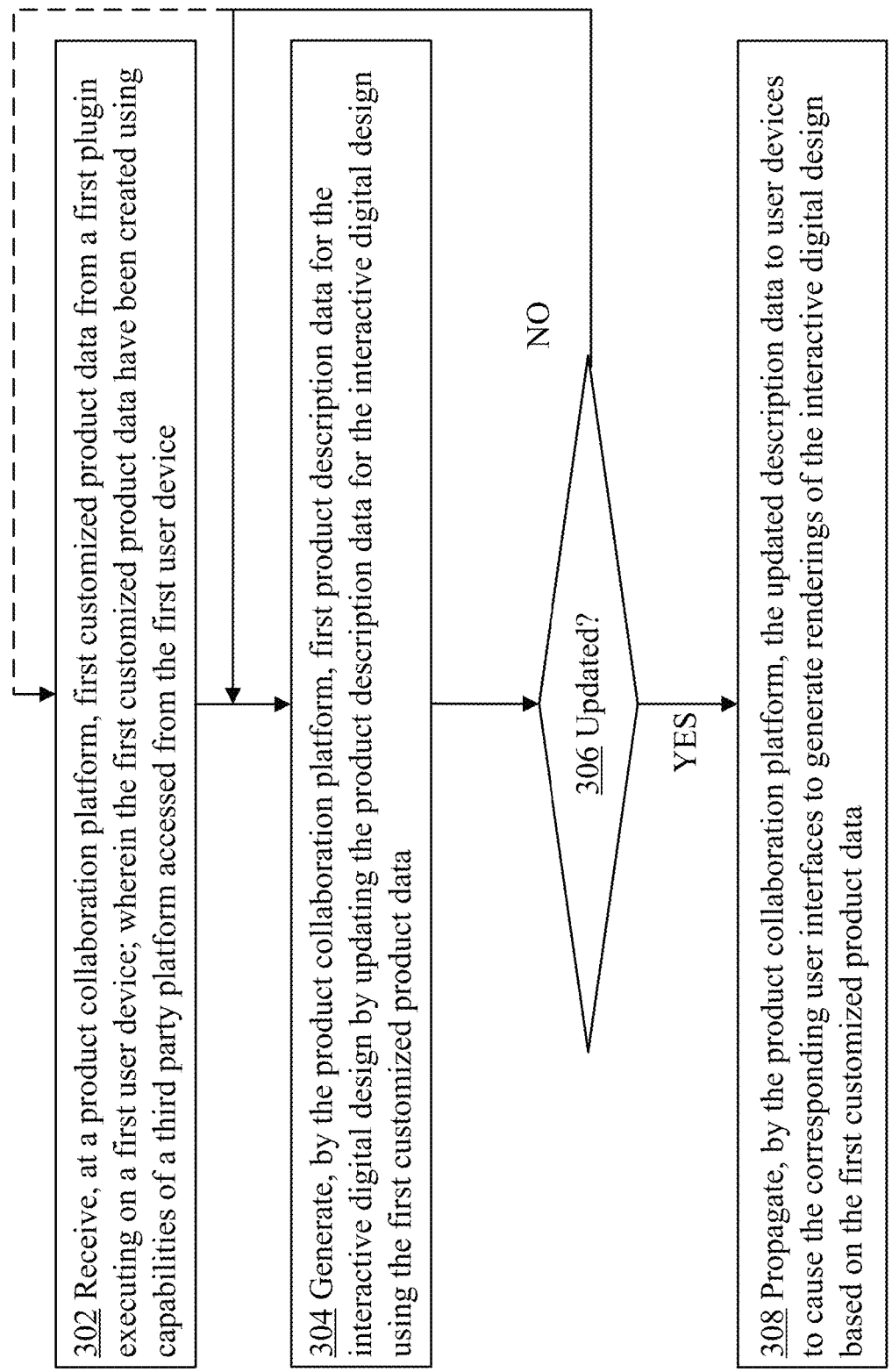
FIG. 3A is a flow chart showing an example process of interfacing with a product collaboration platform using a first plugin downloaded onto a third party platform.

FIG. 3A is a flow chart showing an example process of interfacing with a product collaboration platform using a first plugin downloaded onto third party platform 1000. The process of interfacing with the collaboration platform is performed using the collaboration platform. The steps described in FIG. 3A are illustrated using a block diagram shown in FIG. 3B, which is a block diagram showing an example process of interfacing with a product collaboration platform using a plugin downloaded onto a third party platform, and FIG. 3C, which is a block diagram showing an example process of interfacing with a product collaboration platform using a plugin downloaded onto the third party platform.

Referring again to FIG. 3A, in step 302, a product collaboration platform receives first customized product data from a first plugin that has been stored in, for example, a shared library, and then downloaded onto, for example, a third party platform.

The first customized product data are the data that are associated with product description data for an interactive digital design. The first customized product data may be created by the user as the user creates the interactive design using the capabilities of the third party platform.

Figure 3B:
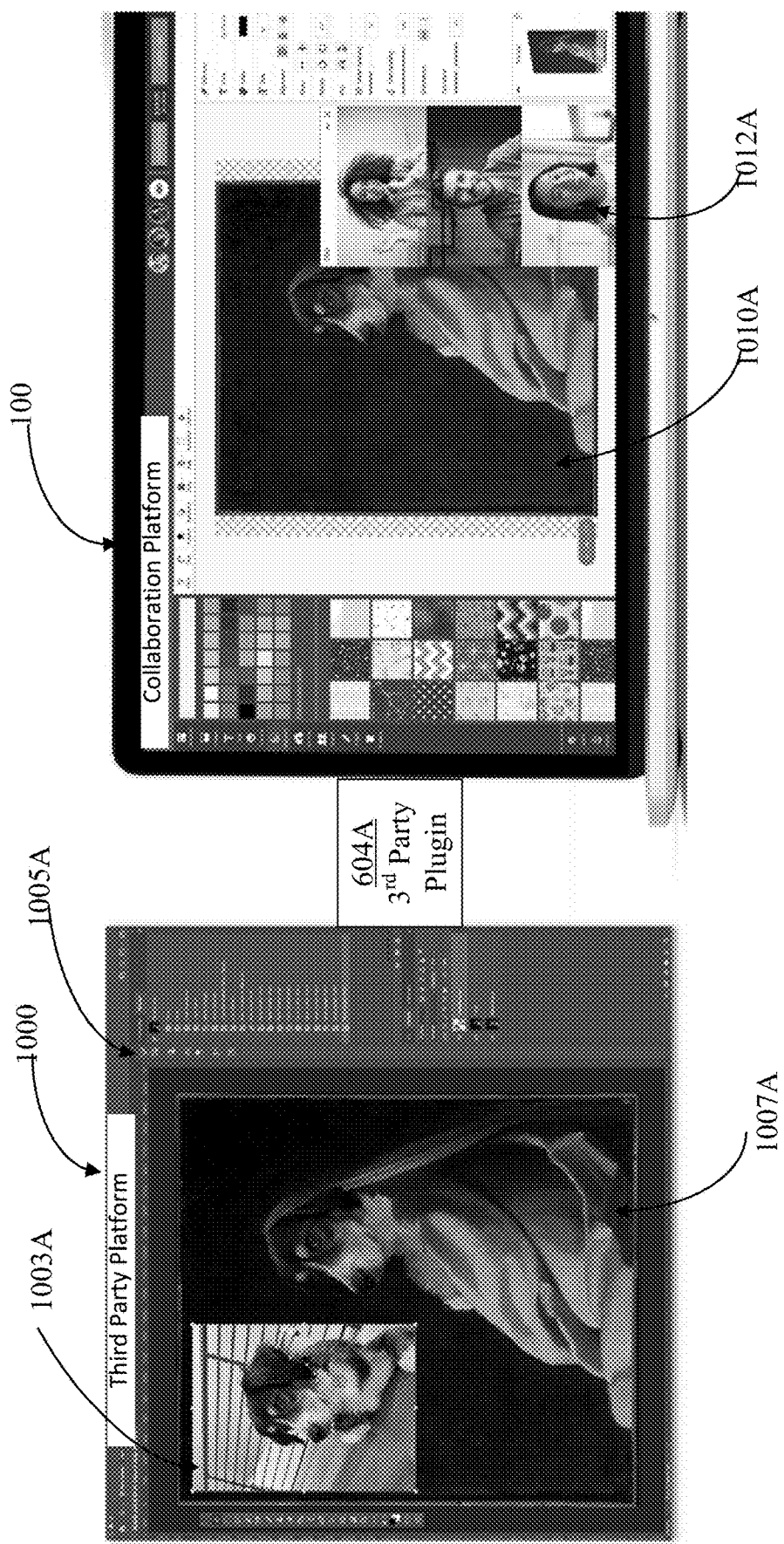
FIG. 3B is a block diagram showing an example process of interfacing with a product collaboration platform using a plugin downloaded onto a third party platform.

Referring to FIG. 3B/3C, suppose that a user accessed a third party platform 1000 that provides tools 1005A/1005B for editing photographs. Referring to FIG. 3B, suppose that the user uses photograph editing tools 1005A executed on third party platform 1000 to combine a photograph 1007A depicting a woman wearing a gray coat and a photograph 1003 depicting a dog. As the user is editing and customizing photograph 1007A, third party platform 1000 may create a data file that captures information about the attributes of the edited photograph 1007A. That data file may be called the first customized product data and may contain the data that describe the interactive design, i.e., the edited photograph 1007A.

Figure 3C:
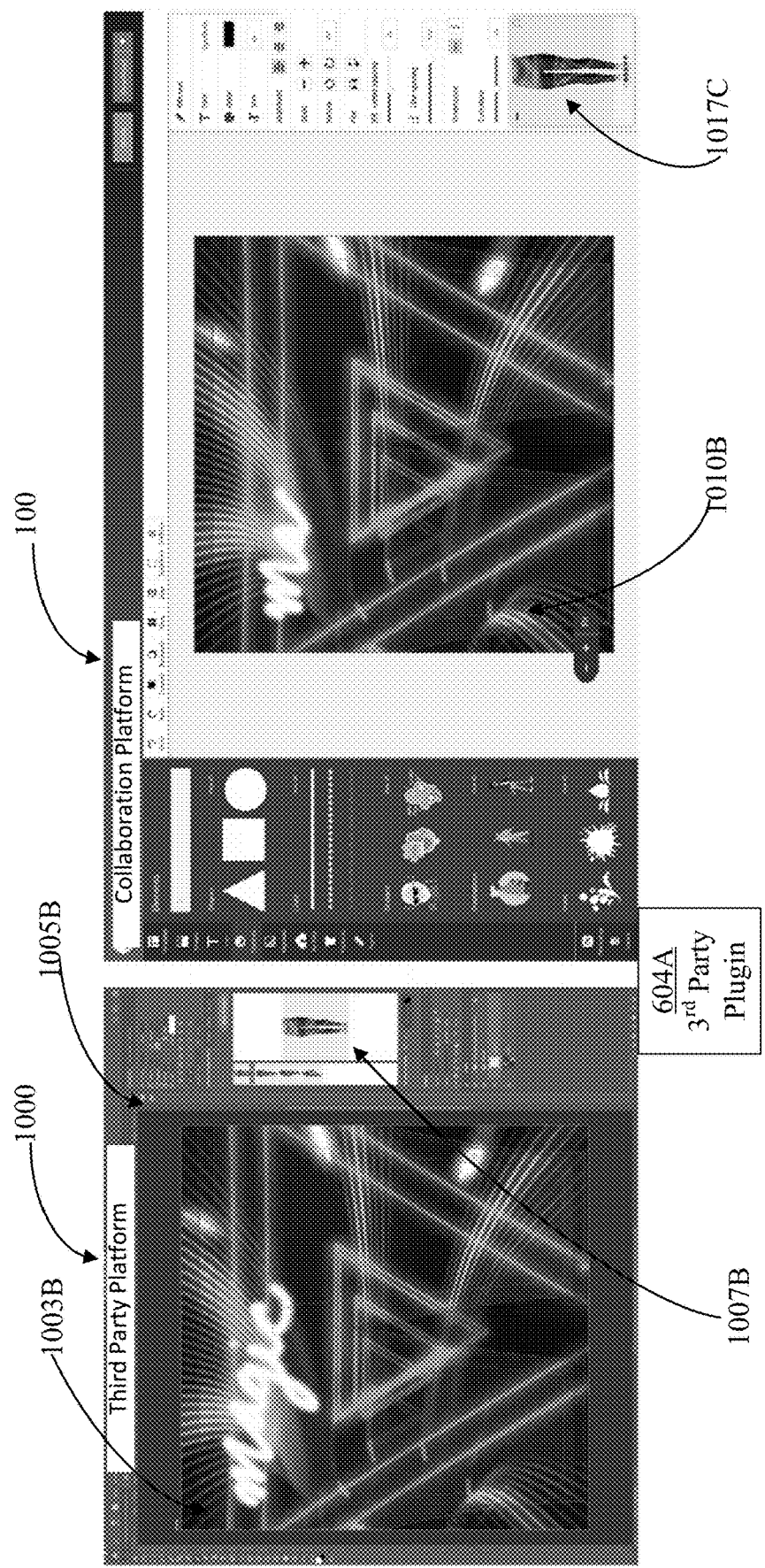
FIG. 3C is a block diagram showing an example process of interfacing with a product collaboration platform using a plugin downloaded onto a third party platform.

Referring to FIG. 3C, suppose that the user uses photograph editing tools 1005B executed on third party platform 1000 to edit and customize a design pattern 1003B that is being used in an image 1007B depicting a pair of tights worn by a woman. As the user is editing and customizing a pattern 1003B, third party platform 1000 may create a data file that captures information about the attributes of edited pattern 1003B and photograph 1007B. That data file may be called the first customized product data and may contain the data that describe the interactive design, the pair of tights having pattern 1003B.

The first plugin may correspond to third party plugin 604A shown in FIG. 1BB, and may be a software application, or a software component, configured to add specific features to third party platform 1000 to enhance the capabilities of the third party platform. The plugin may be downloaded and installed from a shared library or a website that provides the authorized plugins. The plugin may be configured to enable third party developers to extend the original capabilities of third party platform 1000.

The actual implementation of plugin 604A may depend on the services provided by third party platform 1000. Third party platform 1000 and/or collaboration platform 100 may operate independently of the plugin, making it possible for the user to add and update the plugins dynamically without making changes to third party platform 1000 and/or collaboration platform 100. The first plugin may be dynamically loaded at run time.

The product description data are the data that are associated with the interactive digital design and that are maintained by the product collaboration platform to capture all characteristics and relationships involving the interactive digital design.

The first customized product data may be created using, for example, the capabilities of third party platform 1000 accessed from the first user device.

Referring again to FIG. 3A, in step 304, the product collaboration platform generates first product description data for the interactive digital design. The first product description data may be generated by updating the product description data for the interactive digital design using the first customized product data.

For example, referring again to FIG. 3B/3C, computer collaboration platform 100 may retrieve the product description data associated with the interactive design and use the first customized product data saved in the file generated by third party platform 1000 and communicated from third party platform 1000 to product collaboration platform 100 through plugin 604A, to update the product description data for the interactive digital design.

Referring again to FIG. 3B, suppose that a user uses third party platform 1000 to edit 1007A by including a headshot from photograph 1003A, while according to FIG. 3C, a user used third party platform 1000 to edit photograph 1007B using the modified pattern 1003B. The attributes of the resulting composition of photograph 1007A/1007B may be captured using the first product description data and used to update the product description data stored by product collaboration platform 100. The resulting first product description data will capture the original characteristics of the photograph (i.e., the product description data associated with original photograph 1007A or photograph 1007B) and the characteristics of edited photograph 1007A or photograph 1007B.

While customizing a photograph, as in the example described above, may be performed using both platforms, i.e., product collaboration platform 100 and third party platform 1000, it is possible that some users may prefer to use their third party platforms to process, modify, or enhance digital images as their artwork and collections have been developed using the third party platforms. Therefore, depending on the project and the project requirements, in some situations, the users might prefer using the capabilities of third party platform 1000 to create, edit and refine their designs using the third party platforms.

Referring again to FIG. 3A, in step 306, the product collaboration platform tests whether updating of the product description data for the interactive design has been finished. If it has, then the product collaboration platform proceeds to perform step 308. Otherwise, the product collaboration platform continues testing in step 306, or awaits new customized product data.

As described before, depending on the circumstances, the user may want to publish, i.e., display and/or visualize, the resulting interactive design using either collaboration platform 100 or third party platform 1000.

Referring again to FIG. 3B, suppose that, once the first product description data for the interactive digital design is generated, the user may want to publish the first product description data using product options framework 110. More specifically, using the capabilities of product options framework 110, the user may cause the framework to generate a visual representation of a depiction 1010A showing, for example, edited photograph 1007A as shown in FIG. 3B. The visual representation of depiction 1010A may be displayed on a display device of the user's device. Furthermore, the visual representation of depiction 1010A may be propagated to display devices of other users 1012A with whom the user is collaborating, and subsequently, displayed on the user devices of other users 1012A.

Referring again to FIG. 3C, suppose that, once the first product description data for the interactive digital design is generated, the user may want to publish the first product description data using product options framework 110 and using the capabilities of third party platform 1000. More specifically, using the capabilities of product options framework 110, the user may cause the framework to generate a visual representation of a depiction 1017C using the capabilities of platform 100, and a visual representation of depiction 1007 using the capabilities of third party platform 1000. The visual representation of depiction 1017C may be displayed on a display device of a user device used by the user. Furthermore, the visual representation of depiction 1017C may be propagated to display devices of other users with whom the user is collaborating, and subsequently, displayed on the user devices of other users.

11.3. Interfacing Using a Plugin Downloaded onto a Product Collaboration Platform Referring again to FIG. 1BBB, user 102A may establish a collaboration session with product collaboration platform 100 and a collaboration session with third party platform 1000. Using plugin 604A downloaded onto collaboration platform 100, the user may utilize the capabilities of both product options framework 110 of product collaboration platform 100 and graphics engine 1004 of third party platform 1000.

11.3. Example Flow Chart

Figure 4A:
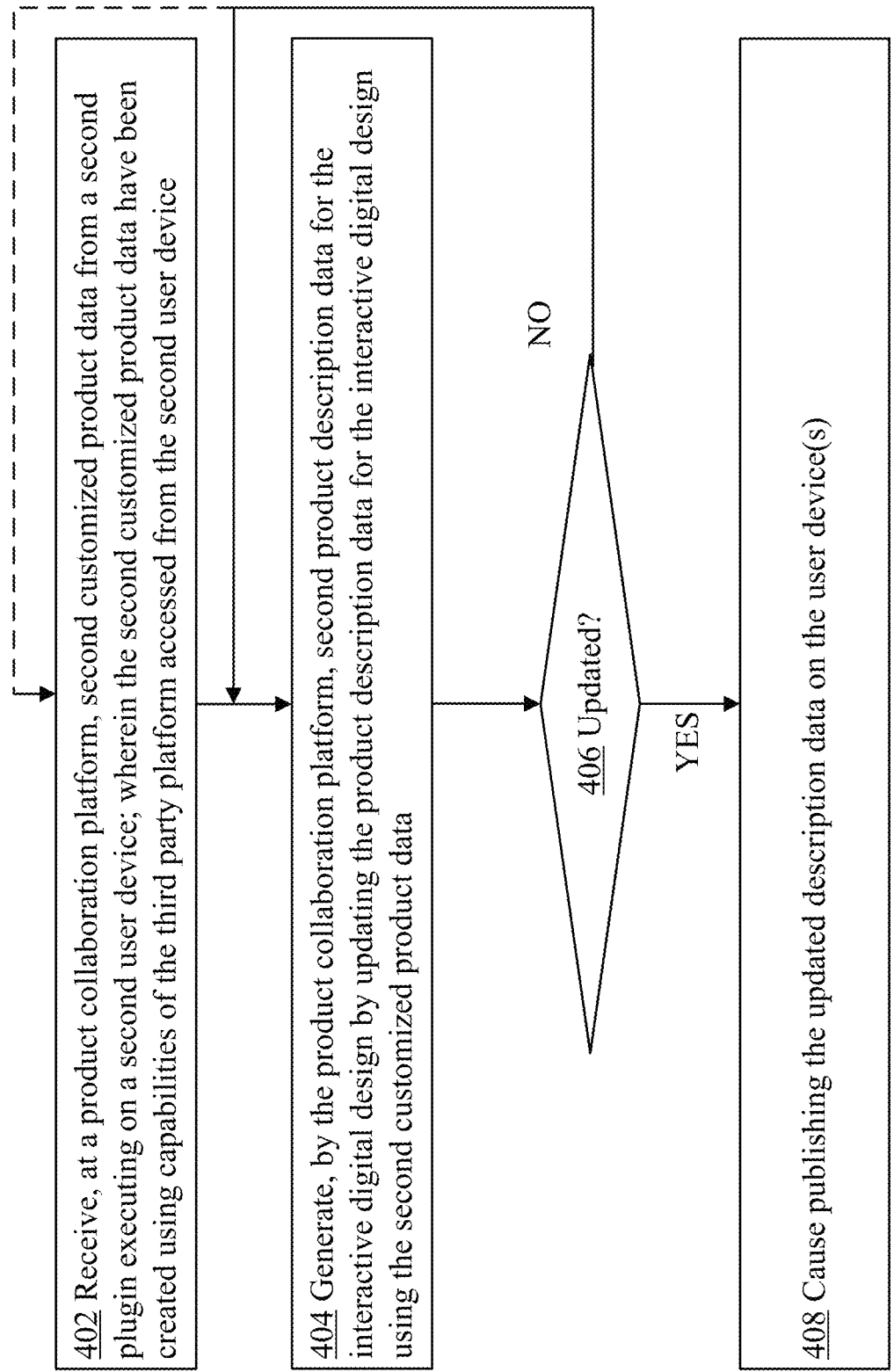
FIG. 4A is a flow chart showing an example process of interfacing with a product collaboration platform using a second plugin downloaded onto a product collaboration platform.

FIG. 4A is a flow chart showing an example process of interfacing with a product collaboration platform using a second plugin downloaded onto product collaboration platform 1000. The process of interfacing with the collaboration platform is performed using the collaboration platform. The steps described in FIG. 4A are illustrated using a block diagram shown in FIG. 4B, which is a block diagram showing an example process of interfacing with a product collaboration platform using a plugin downloaded onto the product collaboration platform, and FIG. 4C, which is a block diagram showing an example process of interfacing with a product collaboration platform using a plugin downloaded onto the product collaboration platform.

Referring again to FIG. 4A, in step 402, a product collaboration platform receives second customized product data from a second plugin that has been stored in, for example, a shared library, and then downloaded onto, for example, the product collaboration platform.

The first customized product data are the data that are associated with product description data for an interactive digital design. The first customized product data may be created by the user as the user creates the interactive design using the capabilities of the third party platform.

Figure 4B:
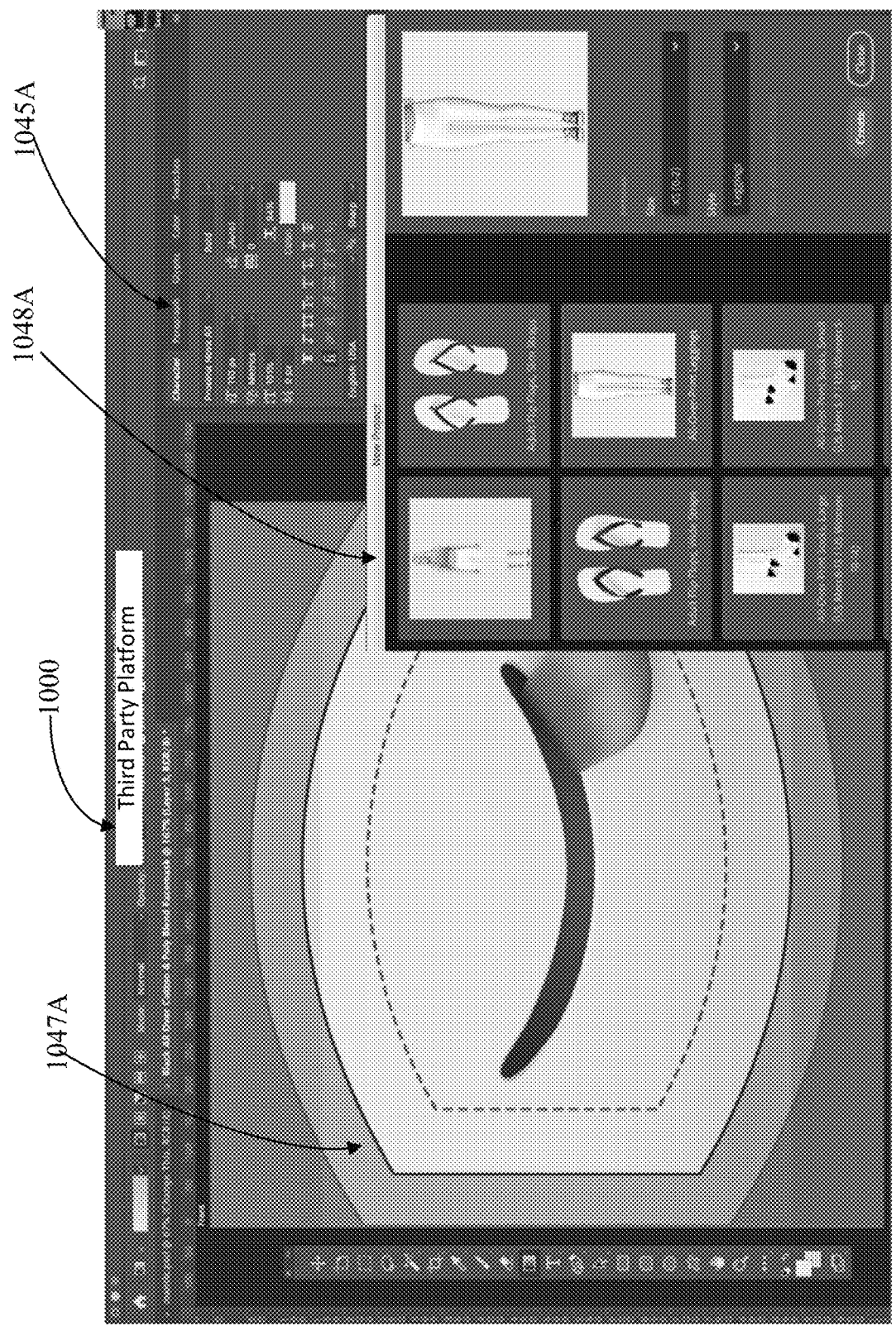
FIG. 4B is a block diagram showing an example process of interfacing with a product collaboration platform using a plugin downloaded onto the product collaboration platform.
Figure 4C:
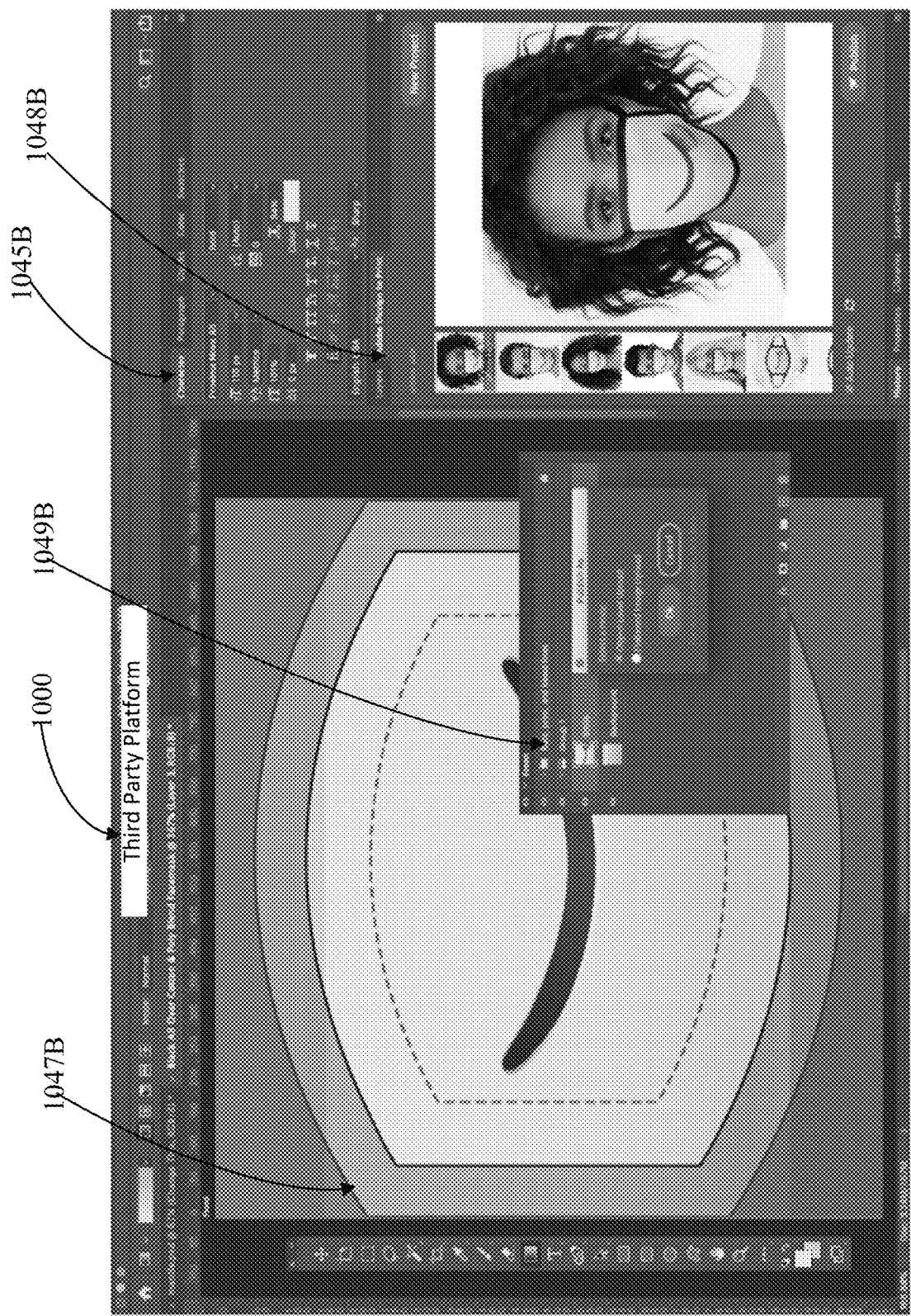
FIG. 4C is a block diagram showing an example process of interfacing with a product collaboration platform using a plugin downloaded onto the product collaboration platform.

Referring to FIG. 4B/4C, suppose that a user accessed a third party platform 1000 that provides tools 1045A/1045B for editing photographs. Suppose that the user uses photograph editing tools 1045A executed on third party platform 1000 to edit and customize a face-mask-image 1047A/1047B. Using tools 1045A/1045B, the user may select a variety of layers of the image, create new layers, combine the layers into a group of layers, and the like. For example, image 1047A may include a background layer, which is depicted using a darker shade of yellow, and a smile layer, which shows a depiction of a smile. Other examples of layers may include depiction of individuals whose depictions may be used as a background for the face-mask and to create a composition of an image of a person and an image of the face-mask. Each of the layers may be defined and modified.

Referring to FIG. 4B, suppose that the user also accessed, from product collaboration platform 100, one or more projects 1048A that are available to the user and/or to which the user has access.

As the user is editing and customizing image 1047A/1047B (shown in FIG. 4B/4C), third party platform 1000 may create a data file that captures information about the attributes of the edited image 1047A/1047B. That data file may be called the second customized product data and may contain the data that describe the interactive design, i.e., the edited image 1047A/1047B.

The second plugin (not shown in FIG. 4B/4C) may correspond to a plugin downloaded onto product collaboration platform 100, and may be a software application, or a software component, configured to add specific features to collaboration platform 100 to enhance the capabilities of the collaboration platform. The plugin may be downloaded and installed from a shared library or a website that provides the authorized plugins. The plugin may be configured to extend the original capabilities of collaboration platform 100.

The product description data are the data that are associated with the interactive digital design and that are maintained by the product collaboration platform to capture all characteristics and relationships involving the interactive digital design.

Referring again to FIG. 4A, in step 404, the product collaboration platform generates second product description data for the interactive digital design. The second customized product data may be created using, for example, the capabilities of third party platform 1000 accessed from the second user device.

The second product description data may be generated by updating the product description data for the interactive digital design using the second customized product data. For example, referring again to FIG. 4B/4C, computer collaboration platform 100 may retrieve the product description data associated with the interactive design and use the second customized product data saved in the file generated by third party platform 1000 and communicated from third party platform 1000 to product collaboration platform 100 through the plugin, to update the product description data for the interactive digital design.

Referring again to FIG. 4B/4C, suppose that a user uses third party platform 1000 to edit face-mask image 1047A/1047B. The attributes of the face-mask image 1047A/1047B may be captured using the second product description data and used to update the product description data stored by product collaboration platform 100. The resulting second product description data will capture the original characteristics of the photograph (i.e., the product description data associated with original image 1047A or image 1047B) and the characteristics of edited image 1047A or image 1047B.

Referring again to FIG. 4A, in step 406, the product collaboration platform tests whether updating of the product description data for the interactive design has been finished. If it has, then the product collaboration platform proceeds to perform step 408. Otherwise, the product collaboration platform continues testing in step 406, or awaits new customized product data.

As described before, depending on the circumstances, the user may want to publish, i.e., display and/or visualize, the resulting interactive design using either collaboration platform 100 or third party platform 1000.

Referring again to FIG. 4C, suppose that, once the second product description data for the interactive digital design is generated, the user may want to publish the second product description data the capabilities of third party platform 1000. More specifically, using the capabilities of third party platform 1000, the user may access a publishing GUI 1049B.

GUI 1049B may be organized and arranged in many different ways. The GUI depicted in FIG. 4C allows the user to generate a visual representation of a depiction 1047B showing, for example, individual layers of image 1047B (just a yellow background or the yellow background with a face-mask with a smile, and the like).

Third party platform 1000 may also provide a GUI 1048B that allows, for example, selecting design to print options. The options may include selecting different background images such as different depictions of women wearing a face-mask, depictions of men wearing a face-mask, depiction of a face-mask itself, and the like.

The visual representation of depiction 1047B may be displayed on a display device of a user device used by the user. Furthermore, the visual representation of depiction 1047B may be propagated to display devices of other users with whom the user is collaborating, and subsequently, displayed on the user devices of other users.

12. Examples of Interfacing Scenarios

Interfacing third party platforms with a product collaboration platform and interfacing the product collaboration platform with the third party platforms may be implemented using one or more plugins. The different implementations of the plugins allow the users of different platforms to collaborate with each other on various interactive designs and via collaboration sessions. The approach for interfacing different platforms with each other allows the users of different platforms to utilize the functionalities of different platforms as the users create interactive digital designs across the platforms.

For example, the users may collaborate with each other across different third party platforms on the same projects supported by the product collaboration platform. This example of collaboration is depicted in FIG. 5A.

According to another example, the users may collaborate with each other across different third party platforms. This example of collaboration is depicted in FIG. 5B.

12.1. Collaboration with Different Third Party Platforms

Figure 5A:
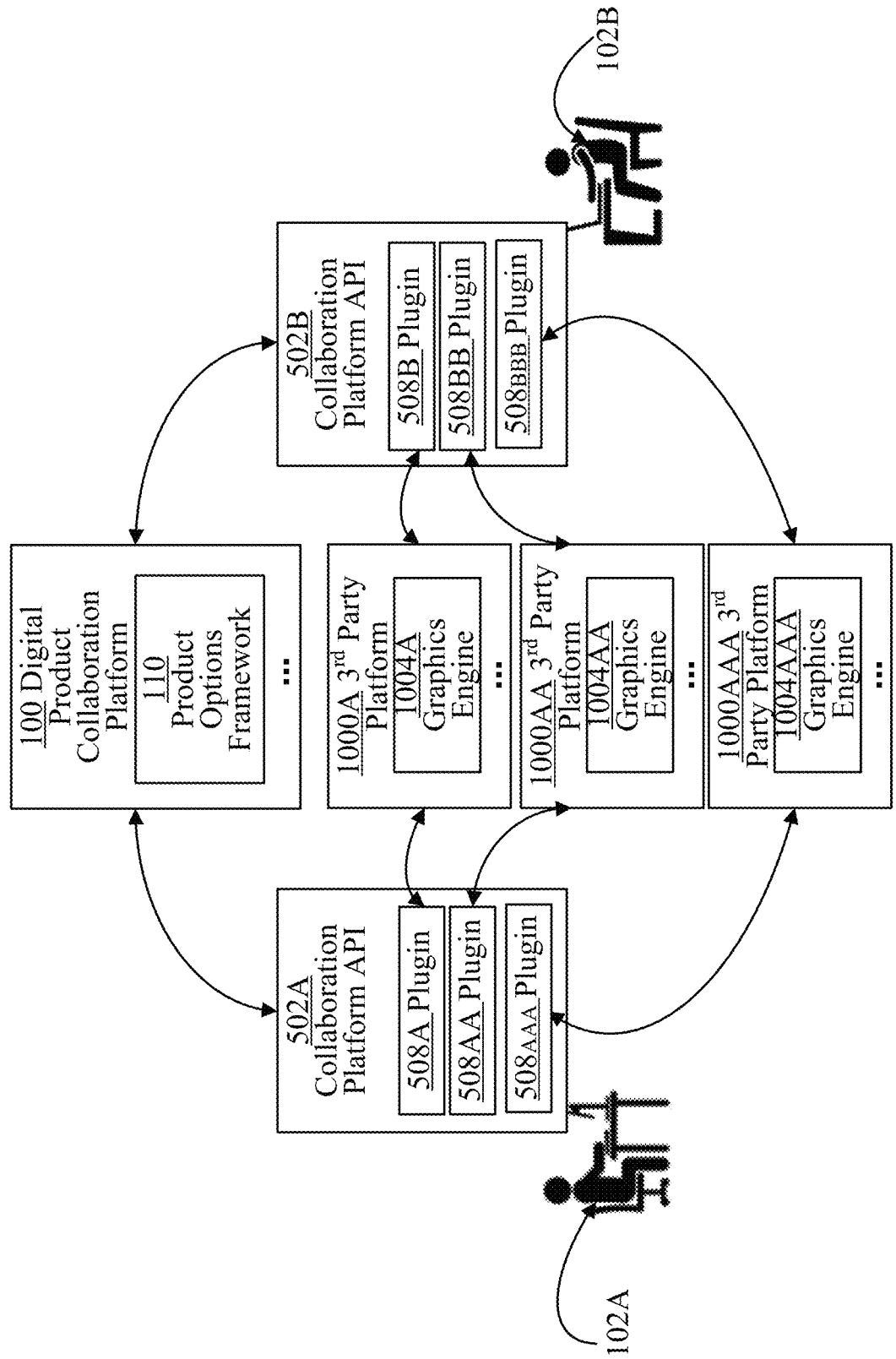
FIG. 5A is a block diagram showing an example process of interfacing with a product collaboration platform using plugins downloaded onto third party platforms.
Figure 5B:
FIG. 5B is a block diagram showing an example process of interfacing with a product collaboration platform using multiple plugins.

FIG. 5A is a block diagram showing an example process of interfacing with a product collaboration platform using plugins downloaded onto third party platforms. In the depicted example, user 102A collaborates with a user 102B. User 102A may access, from his user device, a collaboration platform application programming interface (API) 502A. The collaboration platform API may provide a suite of capabilities of the collaboration platform 100, as well as one or more plugin capabilities of plugins 508A, 508AA, 508AAA, and the like.

As also depicted in FIG. 5A, user 102B collaborates with user 102A. User 102B may access, from his user device, a collaboration platform API 502B. The collaboration platform API may provide a suite of capabilities of the collaboration platform 100, as well as one or more plugin capabilities of plugins 508B, 508BB, 508BBB, and the like.

To provide a simple example, it is assumed that plugins 508A and 508B provide the capabilities of a third party platform 1000A equipped with a graphics engine 1004A. It is further assumed that plugins 508AA and 508BB provide the capabilities of a third party platform 1000AA equipped with a graphics engine 1004AA. Moreover, it is assumed that plugins 508AAA and 508BBB provide the capabilities of a third party platform 1000AAA equipped with a graphics engine 1004AAA.

One of the reasons for providing plugins 508A-AA-AAA/508B-BB-BBB is that there might be some circumstances in which using third party platforms may be more convenient and more versatile to use for some users than using, for example, collaboration platform 100. Therefore, depending on the project and the project requirements, in some situations, the users might prefer using the capabilities of the third party platforms, while in other situations, the users might prefer using the capabilities of the collaboration platform.

Furthermore, depending on the circumstances, the users might want to publish, i.e., display and/or visualize, the resulting interactive design using either a collaboration platform or any of the third party platforms. For example, if the user wants to share his interactive design with his friends who use a particular third party platform, then the user might prefer publishing his design using the third party platform so collaborate on the design using the third party platform. However, if the user's friends use the collaboration platform, then the user might prefer publishing his design using the collaboration platform.

Collaboration sessions (depicted in FIG. 5A using arrows) may be established between the users of a product collaboration platform and the users of third platforms. The sessions may be implemented to provide the capabilities of both types of platforms to both groups of users. The collaboration session may be configured to, for example, provide real-time interactivity and interfacing functionalities that can be enjoyed by both the users of the collaboration platform and the third party platforms.

The two-way interactivity makes the capabilities of the collaboration platform available to the users of the third party platforms and the capabilities of the third platforms available to the users of the collaboration platform. Examples of capabilities of the collaboration platform include the automated concierge functionalities for creating/modifying/ordering interactive digital designs, role-based collaboration functionalities, designer-assisted functionalities for generating interactive designs, and the like. Examples of capabilities of the third platforms include the functionalities supported by the third party platforms, and include, for example, graphics editing, photograph editing, digital images manipulation, and the like.

12.2. Multiple Plugins

FIG. 5B is a block diagram showing an example process of interfacing with a product collaboration platform using multiple plugins. The multiple plugins may be accessible from both product collaboration platform 100 and third party platform 1000. In the depicted example, collaboration platform 100 provides the capabilities of several third party platforms. However, a similar arrangement may be available from third party platform 1000. Access to the capabilities of third party platforms may be arranged using various types of GUIs, hyperlinks, links, and the like.

In the example depicted in FIG. 5B, an API generated by a product collaboration platform 100 provides several icons, including 510A, 510AA, 510AAA, and the like. Each of the icons may correspond to a different plugin that has been downloaded from, for example, a shared library, to the API of product collaboration platform 100. For example, icon 510AAA may correspond to a Photoshop plugin, and therefore, if a user selects icon 510AAA, the user may access the Photoshop functionalities that otherwise would not have been available to the user from product collaboration platform 100.

Although not depicted in FIG. 5B, third party platforms may provide the capabilities of product collaboration platform 100. Access to the capabilities of product collaboration platform 100 from a third party platform may be arranged using various types of GUIs, hyperlinks, links, and the like. For example, an API generated by a third party platform may provide an icon labeled with an abbreviated indication of platform 100. The icon may correspond to a plugin that has been downloaded form, for example, a shared library, to the API of the third party platform, and that may be used by a user to access the functionalities of product collaboration platform 100 which otherwise would not have been available to the user from the third party platform.

13. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
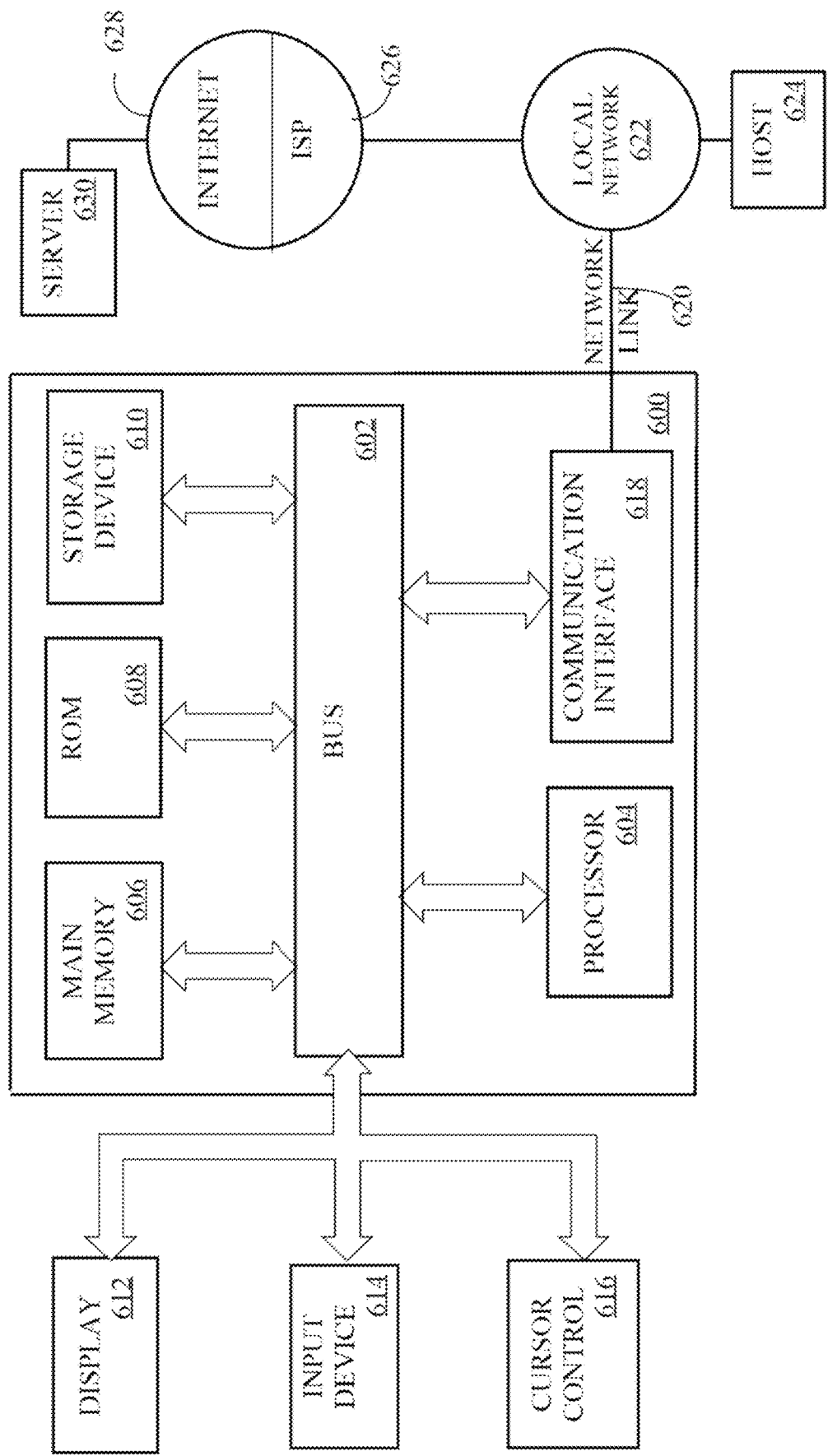
FIG. 6 is a block diagram of a computer system on which embodiments of the approach may be implemented.

FIG. 6 is a block diagram that depicts an example computer system 600 upon which embodiments may be implemented. Computer system 600 includes a bus 602 or other communication mechanism for communicating information, and a processor 604 coupled with bus 602 for processing information. Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. Although bus 602 is illustrated as a single bus, bus 602 may comprise one or more buses. For example, bus 602 may include without limitation a control bus by which processor 604 controls other devices within computer system 600, an address bus by which processor 604 specifies memory locations of instructions for execution, or any other type of bus for transferring data or signals between components of computer system 600.

An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input-device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic or computer software which, in combination with the computer system, causes or programs computer system 600 to be a special-purpose machine. According to one embodiment, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 600, various computer-readable media are involved, for example, in providing instructions to processor 604 for execution. Such a medium may take many forms, including but not limited to, non-volatile media and volatile media. Non-volatile media includes, for example, optical or magnetic disks, such as storage device 610. Volatile media includes dynamic memory, such as main memory 606. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip, or memory cartridge, or any other medium from which a computer can read.

Various forms of computer-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated service digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world-wide packet data communication network now commonly referred to as the "Internet" 628. Local network 622 and Internet 628 both use electrical, electromagnetic, or optical signals that carry digital data streams.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

In the foregoing specification, embodiments have been described with reference to numerous specific details that may vary from implementation to implementation. Thus, the sole and exclusive indicator of what is, and is intended by the applicants to be, the approach is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
receiving, at a computer collaboration computer, first customized product data from a first plugin executing on a first user device accessing a plurality of capabilities of a third party platform;
wherein the first customized product data are associated with product description data for an interactive digital design;
generating, by the computer collaboration computer, first product description data for the interactive digital design by updating the product description data for the interactive digital design using the first customized product data;
for a particular custom product from the particular custom products:
obtaining a manufacturing method for manufacturing the particular custom product;
based on the manufacturing method, determining a manufacturing constraint and physical constraints for the particular custom product;
generating transformed shared content by transforming a shared content, which is shared by all of the particular custom products and is applied to each custom product of the particular custom products to satisfy the manufacturing constraint and the physical constraints for the particular custom product;
wherein the shared content comprises one or more content types including a shared set of text, image, or color content;
wherein each of the shared set of text, the image, or the color content comprises sets of attributes that is applied to each custom product of the particular custom products;
wherein the manufacturing constraint and the physical constraints are specific to the one or more content types of the particular custom product of the particular custom products;
wherein generating the shared content comprises transforming the shared content based on the one or more content types including the shared set of text, the image, or the color content that are shared by the particular custom products;
storing the transformed shared content in association with the particular custom products for manufacturing the particular custom product;
automatically generating a message containing the transformed shared content to entities for manufacturing the particular customized product;
automatically generating a token that allows recipients of the particular customized product to request services from the computer collaboration computer and access core services of the computer collaboration computer;
transmitting a communication, comprising the message and the token, to the entities in real time to cause the entities to:
receiving, by the entities, the communication;
upon receiving the communication, the entities:
extract the message and the token from the communication;
generate manufacturing instructions for manufacturing the particular customized product based on a set of product option key-value pairs, the manufacturing constraints and the physical constraints;
apply the manufacturing constraint and the physical constraints to the sets of attributes of the particular custom product of the particular custom products;
generate, based on the manufacturing constraint and the physical constraints, the set of product option key-value pairs;
manufacture the particular customized product according to the manufacturing instructions and the set of product option key-value pairs; and embed the token in the particular customized product to allow the recipients of the particular customized product to request the services from the computer collaboration computer.

2. The computer-implemented method of claim 1, further comprising:
   receiving, at the computer collaboration computer, second customized product data from a second plugin executing on a second user device accessing a plurality of capabilities of the computer collaboration computer;
   wherein the second customized product data are associated with product description data for the interactive digital design;
   wherein the second customized product data have been created using a plurality of capabilities of a third party platform accessed from the second user device;
   generating, by the computer collaboration computer, second product description data for the interactive digital design by updating the product description data for the interactive digital design using the second customized product data;
   causing publishing the second product description data.

3. The computer-implemented method of claim 2, wherein the first plugin and the second plugin are computer program applications executing to provide functionalities of one or more third party platforms to users of the computer collaboration computer.

4. The computer-implemented method of claim 1, further comprising:
   receiving, at the computer collaboration computer, third customized product data from a third plugin executing on the computer collaboration computer;
   wherein the third customized product data are associated with product description data for the interactive digital design;
   wherein the third customized product data have been created using a plurality of capabilities of a third party platform accessed from the first user device;
   wherein the third customized product data has been published using the plurality of capabilities of the third party platform;
   generating, by the computer collaboration computer, second product description data for the interactive digital design by updating the product description data for the interactive digital design using second customized product data.

5. The computer-implemented method of claim 1, further comprising:
   receiving, at the computer collaboration computer, an electronic digital request, from a first user interface that executes on the first user device associated with a first user, to invite a second user, who uses a second user device, to collaborate on the interactive digital design;
   in response to receiving the electronic digital request, granting to the second user, by the computer collaboration computer, access to the product description data for the interactive digital design and causing displaying the interactive digital design on the second user device;
   receiving, at the computer collaboration computer, second customized product data from a second plugin executing on the second user device;
   wherein the second customized product data are associated with product description data for the interactive digital design;
   wherein the second customized product data have been created using a plurality of capabilities of a third party platform accessed from the second user device;
   generating, by the computer collaboration computer, second product description data for the interactive digital design by updating the product description data for the interactive digital design using the second customized product data;
   publishing, at the computer collaboration computer, the second product description data;
   propagating the second product description data to the first user device and the second user device to cause the first user device and a second user device to generate renderings of the interactive digital design based on the second product description data.

6. The computer-implemented method of claim 5, wherein the first user device and the second user device communicate with the computer collaboration computer via one or more communications channels;
   wherein the one or more communications channels include one or more of: a text chat, a video chat, a phone chat, or a GUI;
   wherein the one or more communications channels facilitate a collaborative video screen sharing.

7. The computer-implemented method of claim 5, wherein granting, the second user, access to product description data for the interactive digital design is based on a role assigned a user, wherein the role is selected from one or more of: a user role, a user support agent role, a graphics designer role, a user peer role, or a custom product artist role.

8. The computer-implemented method of claim 7, wherein the particular custom products belong to one or more functional product groups.

9. One or more non-transitory computer readable storage media storing one or more instructions which, when executed by one or more processors, cause the one or more processors to perform:
   receiving, at a computer collaboration computer, first customized product data from a first plugin executing on a first user device accessing a plurality of capabilities of a third party platform;
   wherein the first customized product data are associated with product description data for an interactive digital design;
   generating, by the computer collaboration computer, first product description data for the interactive digital design by updating the product description data for the interactive digital design using the first customized product data;
   for a particular custom product from the particular custom products:
      obtaining a manufacturing method for manufacturing the particular custom product;
      based on the manufacturing method, determining a manufacturing constraint and physical constraints for the particular custom product;
      generating transformed shared content by transforming a shared content, which is shared by all of the particular custom products and is applied to each custom product of the particular custom products to satisfy the manufacturing constraint and the physical constraints for the particular custom product;
   wherein the shared content comprises one or more content types including a shared set of text, image, or color content;

wherein each of the shared set of text, the image, or the color content comprises sets of attributes that is applied to each custom product of the particular custom products;

wherein the manufacturing constraint and the physical constraints are specific to the one or more content types of the particular custom product of the particular custom products;

wherein generating the shared content comprises transforming the shared content based on the one or more content types including the shared set of text, the image, or the color content that are shared by the particular custom products;

storing the transformed shared content in association with the particular custom products for manufacturing the particular custom product;

automatically generating a message containing the transformed shared content to entities for manufacturing the particular customized product;

automatically generating a token that allows recipients of the particular customized product to request services from the computer collaboration computer and access core services of the computer collaboration computer;

transmitting a communication, comprising the message and the token, to the entities in real time to cause the entities to:

receiving, by the entities, the communication:

upon receiving the communication, the entities:

extract the message and the token from the communication;

generate manufacturing instructions for manufacturing the particular customized product based on a set of product option key-value pairs, the manufacturing constraints and the physical constraints;

apply the manufacturing constraint and the physical constraints to the sets of attributes of the particular custom product of the particular custom products;

generate, based on the manufacturing constraint and the physical constraints, the set of product option key-value pairs;

manufacture the particular customized product according to the manufacturing instructions and the set of product option key-value pairs; and embed the token in the particular customized product to allow the recipients of the particular customized product to request the services from the computer collaboration computer.

10. The one or more non-transitory computer readable storage media of claim 9, storing additional instructions for:

receiving, at the computer collaboration computer, second customized product data from a second plugin executing on a second user device accessing a plurality of capabilities of the computer collaboration computer;

wherein the second customized product data are associated with product description data for the interactive digital design;

wherein the second customized product data have been created using the plurality of capabilities of the computer collaboration computer accessed from the second user device;

generating, by the computer collaboration computer, second product description data for the interactive digital design by updating the product description data for the interactive digital design using the second customized product data;

publishing, at the computer collaboration computer, the second product description data.

11. The one or more non-transitory computer readable storage media of claim 10, wherein the first plugin and the second plugin are computer program applications executing to provide functionalities of one or more third party platforms to users of the computer collaboration computer.

12. The one or more non-transitory computer readable storage media of claim 9, storing additional instructions for:

receiving, at the computer collaboration computer, third customized product data from a third plugin executing on the computer collaboration computer;

wherein the third customized product data are associated with product description data for the interactive digital design;

wherein the third customized product data have been created using a plurality of capabilities of a third party platform accessed from the first user device;

wherein the third customized product data has been published using the plurality of capabilities of the third party platform;

generating, by the computer collaboration computer, second product description data for the interactive digital design by updating the product description data for the interactive digital design using second customized product data.

13. The one or more non-transitory computer readable storage media of claim 9, storing additional instructions for:

receiving, at the computer collaboration computer, an electronic digital request, from a first user interface that executes on the first user device associated with a first user, to invite a second user, who uses a second user device, to collaborate on the interactive digital design;

in response to receiving the electronic digital request, granting to the second user, by the computer collaboration computer, access to the product description data for the interactive digital design and causing displaying the interactive digital design on the second user device;

receiving, at the computer collaboration computer, second customized product data from a second plugin executing on the second user device;

wherein the second customized product data are associated with product description data for the interactive digital design;

wherein the second customized product data have been created using a plurality of capabilities of a third party platform accessed from the second user device;

generating, by the computer collaboration computer, second product description data for the interactive digital design by updating the product description data for the interactive digital design using the second customized product data;

publishing, at the computer collaboration computer, the second product description data;

propagating the second product description data to the first user device and the second user device to cause the first user device and a second user device to generate renderings of the interactive digital design based on the second product description data.

14. The one or more non-transitory computer readable storage media of claim 13, wherein the first user device and the second user device communicate with the computer collaboration computer via one or more communications channels;

wherein the one or more communications channels include one or more of: a text chat, a video chat, a phone chat, or a GUI;

wherein the one or more communications channels facilitate a collaborative video screen sharing.

15. The one or more non-transitory computer readable storage media of claim 13, wherein granting, the second user, access to product description data for the interactive digital design is based on a role assigned a user, wherein the role is selected from one or more of: a user role, a user support agent role, a graphics designer role, a user peer role, or a custom product artist role.

16. The one or more non-transitory computer readable storage media of claim 15, wherein the particular custom products belong to one or more functional product groups.

* * * * *